US005252151A

United States Patent [19]

Inoue et al.

[11] Patent Number: 5,252,151

[45] **Date of Patent: * Oct. 12, 1993**

[54] FE-NI ALLOY SHEET FOR SHADOW MASK HAVING A LOW SILICON SEGREGATION AND METHOD FOR MANUFACTURING SAME

[75] Inventors: Tadashi Inoue; Masayuki Kinoshita; Tomoyoshi Okita, all of Tokyo, Japan

[73] Assignee: NKK Corporation, Tokyo, Japan

[ * ] Notice: The portion of the term of this patent subsequent to Jul. 7, 2009 has been disclaimed.

[21] Appl. No.: 768,918

[22] PCT Filed: Feb. 15, 1991

[86] PCT No.: PCT/JP91/00182

§ 371 Date: Oct. 1, 1991

§ 102(e) Date: Oct. 1, 1991

[87] PCT Pub. No.: WO91/12345

PCT Pub. Date: Aug. 22, 1991

[30] Foreign Application Priority Data

| | | | |
|---|---|---|---|
| Feb. 15, 1990 | [JP] | Japan | 2-32414 |
| Aug. 10, 1990 | [JP] | Japan | 2-210242 |
| Aug. 22, 1990 | [JP] | Japan | 2-218945 |

[51] Int. Cl.$^5$ .......... C12D 8/00; C12D 9/46

[52] U.S. Cl. .......... 148/541; 148/546; 148/547; 148/621; 148/650; 148/500

[58] Field of Search .......... 148/2, 12 A, 12 E, 336, 148/541, 546, 547, 621, 650, 500; 420/94

[56] References Cited

U.S. PATENT DOCUMENTS 5,127,965 7/1992 Inoue et al. .......... 148/500

FOREIGN PATENT DOCUMENTS

| | | |
|---|---|---|
| 0155010 | 9/1985 | European Pat. Off. . |
| 56-136956 | 10/1981 | Japan . |
| 61-39344 | 2/1986 | Japan . |
| 61-113746 | 5/1986 | Japan . |
| 62-40343 | 2/1987 | Japan . |
| 62-185860 | 8/1987 | Japan . |
| 62-238003 | 10/1987 | Japan . |
| 62-243780 | 10/1987 | Japan . |
| 62-243781 | 10/1987 | Japan . |
| 62-243782 | 10/1987 | Japan . |
| 63-230206 | 9/1988 | Japan . |
| 63-235001 | 9/1988 | Japan . |
| 1-52022 | 2/1989 | Japan . |
| 2-25201 | 1/1990 | Japan . |

OTHER PUBLICATIONS

Patent Abstracts of Japan, vol. 6, No. 15 (c-89) Jan. 28, 1982 of JP 56-136956.

*Primary Examiner*—R. Dean

*Assistant Examiner*—Sikyin Ip

*Attorney, Agent, or Firm*—Frishauf, Holtz, Goodman & Woodward

[57] ABSTRACT

An Fe-Ni alloy sheet for a shadow mask, which consists essentially of:

nickel: from 34 to 38 wt. %,
silicon: from 0.01 to 0.15 wt. %,
manganese: from 0.01 to 1.00 wt. %, and
the balance being iron and incidental impurities.

The surface portion of the alloy sheet has a silicon (Si) segregation rate, as expressed by the following formula, of up to 10%:

$$\left| \frac{\left(\text{Si concentration in segregation region}\right) - \left(\text{average Si concentration}\right)}{(\text{Average Si concentration})} \right| \times 100;$$

and a center-line mean roughness (Ra) of the alloy sheet satisfies the following formula:

$$0.3\ \mu m < \leqq Ra \leqq 0.7\ \mu m.$$

The above-mentioned Fe-Ni alloy sheet is manufactured by preparing an Fe-Ni alloy sheet having the chemical composition and the silicon segregation rate as described above, and imparting a center-line mean roughness (Ra) which satisfies the above-mentioned formula onto the both surfaces of the alloy sheet by means of a pair of dull rolls during the final rolling of the alloy sheet for said preparation. The thus manufactured Fe-Ni alloy sheet is excellent in etching pierceability and free from the occurrence of sticking during the annealing.

10 Claims, 5 Drawing Sheets

FE-NI ALLOY SHEET FOR SHADOW MASK HAVING A LOW SILICON SEGREGATION AND METHOD FOR MANUFACTURING SAME

FIELD OF THE INVENTION

The present invention relates to an Fe-Ni alloy sheet for a shadow mask used for a color cathode-ray tube and a method for manufacturing same.

BACKGROUND OF THE INVENTION

Along with the recent tendency toward higher-grade color television sets, a 36 wt. % Ni-Fe alloy known as the INVAR alloy, which is a low-expansion alloy containing 36% nickel, 0.35% manganese and the balance iron with carbon, alloy is attracting the general attention as an alloy for a shadow mask capable of coping with problems such as a color-phase shift. The INVAR alloy has a far smaller thermal expansion coefficient as compared with a low-carbon steel conventionally applied as a material for a shadow mask.

By manufacturing a shadow mask from the INVAR alloy, therefore, even when the shadow mask is heated by an electron beam, there hardly cause such problems as a color-phase shift resulting from thermal expansion of the shadow mask.

However, the above-mentioned alloy sheet for a shadow mask manufactured from the INVAR alloy, i.e., a material sheet prior to the etching-piercing of passage holes for the electron beam (hereinafter simply referred to as the "holes") has the following problems:

(1) Poor etching pierceability:

Because of a high nickel content in the INVAR alloy, the INVAR alloy sheet has, during the etching-piercing, a poor adhesivity of a resist film onto the surface of the INVAR alloy sheet, and a poor corrosivity by an etching solution as compared with a low-carbon steel sheet.

This tends to cause irregularities in the diameter and the shape of the holes pierced by the etching, thus leading to a seriously decreased grade of the color cathode-ray tube.

(2) Easy occurrence of sticking of flat masks during annealing thereof:

An alloy sheet for a shadow mask as pierced by the etching, i.e., a flat mask, is press-formed into a curved surface to match with the shape of the cathode-ray tube. The flat mask is annealed prior to the press-forming in order to improve press-formability thereof. It is the usual practice, at cathode-ray tube manufacturers, to anneal several tens to several hundreds of flat masks made of the INVAR alloy which are placed one on the top of the other at a temperature of from 810° to 1,100° C., which is considerably higher than the annealing temperature of the flat masks made of the low-carbon steel, with a view to improving productivity.

Since the INVAR alloy has a high nickel content, it has a higher strength than a low-carbon steel. A flat mask made of the invar alloy must therefore be annealed at a higher temperature than in a flat mask made of a low-carbon steel. As a result, sticking tends to occur in the flat masks made of the INVAR alloy during the annealing thereof.

For the purpose of solving the problem (1) as described above, the following prior arts are known:

(a) Japanese Patent Provisional Publication No. 61-39,344 discloses limitation of the center-line mean roughness (Ra) of an alloy sheet for a shadow mask within a range of from 0.1 to 0.4 μm (hereinafter referred to as the "prior art 1").

(b) Japanese Patent Provisional Publication No. 62-243,780 discloses limitation of the center-line mean roughness (Ra) of an alloy sheet for a shadow mask within a range of from 0.2 to 0.7 μm, limitation of the average peak interval of the sectional curve representing the surface roughness within a standard length to up to 100 μm, and limitation of the crystal grain size to at least 8.0 as expressed by the grain size number (hereinafter referred to as the "prior art 2").

(c) Japanese Patent Provisional Publication No. 62-243,781 discloses, in addition to the requirements disclosed in the above-mentioned prior art 2, limitation of Re, i.e., the ratio of $\alpha_1/\alpha_2$ of the light-passage hole diameter ($\alpha_1$) to the etching hole diameter ($\alpha_2$) to at least 0.9 (hereinafter referred to as the "prior art 3").

(d) Japanese Patent Provisional Publication No. 62-243,782 discloses that the crystal texture of an alloy sheet for a shadow mask is accumulated through a strong cold rolling and a recrystallization annealing, the crystal grain size is limited to at least 8.0 as expressed by the grain size number, and the surface roughness described in the above-mentioned prior art 2 is imparted to the surface of the alloy sheet for a shadow mask by means of the cold rolling with the use of a pair of dull rolls under the reduction rate of from 3 to 15% (hereinafter referred to as the "prior art 4").

In order to solve the problem (2) as described above, on the other hand, the following prior art is known:

(e) Japanese Patent Provisional Publication No. 62-238,003 discloses limitation of the center-line mean roughness (Ra) of an alloy sheet for a shadow mask within a range of from 0.2 to 2.0 μm, and limitation of the skewness (Rsk) which is a deviation index in the height direction of the roughness curve to at least 0 (hereinafter referred to as the "prior art 5").

However, the above-mentioned prior arts 1 to 4 have the problem in that while it is possible to improve etching pierceability of the alloy sheet to some extent, it is impossible to prevent the occurrence of sticking of the flat masks during the annealing thereof.

The above-mentioned prior art 5 has, on the other hand, a problem in that, while it is possible to prevent sticking of the flat masks made of the low-carbon steel during the annealing thereof to some extent, it is impossible to prevent sticking of the flat masks during the annealing thereof, made of the INVAR alloy which requires a higher annealing temperature than the low-carbon steel.

SUMMARY OF THE DISCLOSURE

An object of the present invention is therefore to provide an Fe-Ni alloy sheet for a shadow mask, which is excellent in etching pierceability and permits certain prevention of sticking of the flat masks during the annealing thereof, and a method for manufacturing same.

In accordance with one of the features of the present invention, there is provided an Fe-Ni alloy sheet for a shadow mask, which consists essentially of:

nickel: from 34 to 38 wt. %, silicon: from 0.01 to 0.15 wt. %, manganese: from 0.01 to 1.00 wt. %, and the balance being iron and incidental impurities;

the surface portion of said alloy sheet having a silicon (Si) segregation rate, as expressed by the following formula, of up to 10%:

$$\left| \frac{\left(\begin{array}{c}\text{Si concentration in} \\ \text{segregation region}\end{array}\right) - \left(\begin{array}{c}\text{average Si} \\ \text{concentration}\end{array}\right)}{\text{(Average Si concentration)}} \right| \times 100;$$

and a center-line mean roughness (Ra) of said alloy sheet satisfying the following formula:

$$0.3\ \mu m \leqq Ra \leqq 0.7\ \mu m.$$

Said Fe-Ni alloy sheet for a shadow mask may further have the following surface roughness:

A skewness (Rsk) of said alloy sheet, which is a deviation index in the height direction of the roughness curve, satisfies the following formula:

$$0.3 \leqq Rsk \leqq 1.0;\ \text{and}$$

said center-line mean roughness (Ra) and said skewness (Rsk) of said alloy sheet satisfies the following formula:

$$Ra \geqq -\tfrac{1}{3}Rsk + 0.5.$$

Said Fe-Ni alloy sheet for a shadow mask may further have the following surface roughness:

said center-line mean roughness (Ra) and said skewness (Rsk) of said alloy sheet in two directions satisfy the following formulae:

$$|Ra(L) - Ra(C)| \leqq 0.1\ \mu m,\ \text{and}$$

$$|Rsk(L) - Rsk(C)| \leqq 0.2,$$

where,

Ra(L): center-line mean roughness of said alloy sheet in the rolling direction,

Ra(C): center-line mean roughness of said alloy sheet in the crosswise direction to the rolling direction, Rsk(L): skewness of said alloy sheet in the rolling direction, and Rsk(C): skewness of said alloy sheet in the crosswise direction to the rolling direction.

Said Fe-Ni alloy sheet for a shadow mask may further have the following surface roughness:

A skewness (Rsk) of said alloy sheet, which is a deviation index in the height direction of the roughness curve, satisfies the following formula:

$$0.3 \leqq Rsk \leqq 1.2;$$

said center-line mean roughness (Ra) and said skewness (Rsk) of said alloy sheet satisfy the following formula:

$$Ra \geqq -\tfrac{1}{3}Rsk + 0.5;$$

and an average peak interval (Sm) of the sectional curve of said alloy sheet satisfies the following formula:

$$70\ \mu m \leqq Sm \leqq 160\ \mu m.$$

Said Fe-Ni alloy sheet for a shadow mask may further have the following surface roughness:

said center-line mean roughness (Ra), said skewness (Rsk) and said average peak interval (Sm) of said alloy sheet in two directions satisfy the following formulae:

$$|Ra(L) - Ra(C)| \leqq 0.1\ \mu m,$$

$$|Rsk(L) - Rsk(C)| \leqq 0.2,\ \text{and}$$

$$|Sm(L) - Sm(C)| \leqq 5.0\ \mu m,$$

where,

Ra(L): center-line mean roughness of said alloy sheet in the folling direction,

Ra(C): center-line mean roughness of said alloy sheet in the crosswise direction to the rolling direction, Rsk(L): skewness of said alloy sheet in the rolling direction, Rsk(C): skewness of said alloy sheet in the crosswise direction to the rolling direction, Sm(L): average peak interval of said alloy sheet in the rolling direction, and Sm(C): average peak interval of said alloy sheet in the crosswise direction to the rolling direction.

In accordance with another features of the present invention, there is provided a method for manufacturing an Fe-Ni alloy sheet for a shadow mask, which comprises the steps of:

preparing an Fe-Ni alloy sheet having the chemical composition and the silicon (Si) segregation rate as described above; and imparting a surface roughness satisfying the above-mentioned formulae onto the both surfaces of said alloy sheet by means of a pair of dull rolls during the final rolling of said alloy sheet for said preparation

DETAILED DESCRIPTION OF PREFERRED EMBODIMENTS

Figure 1:
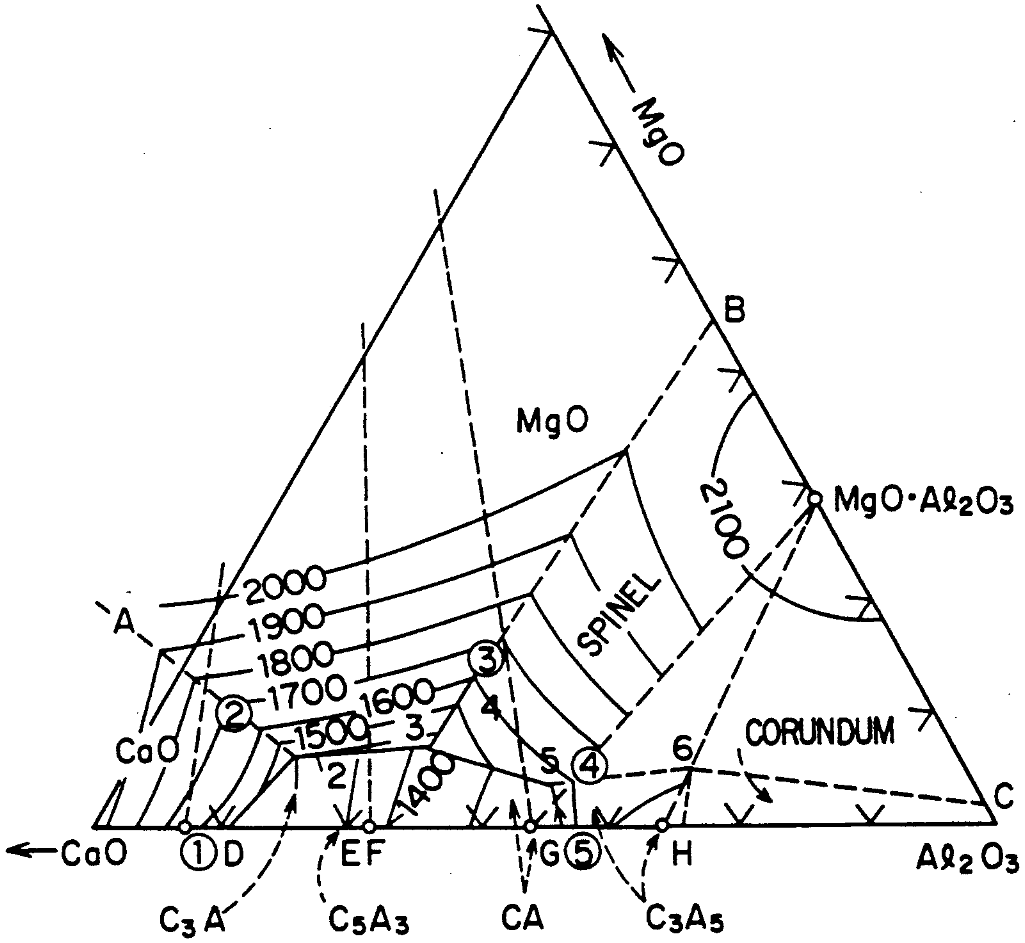
FIG. 1 is a part of the $CaO$-$Al_2O_3$-$MgO$ ternary phase diagram illustrating the region of the chemical composition of non-metallic inclusions contained in the Fe-Ni alloy sheet for a shadow mask of the present invention, which shows the region of the chemical composition of the non-metallic inclusions, entanglement of which into the alloy sheet is not desirable.

From the above-mentioned point of view, extensive studies were carried out to develop an Fe-Ni alloy sheet for a shadow mask, which is excellent in etching pierceability and permits certain prevention of sticking of the flat masks during the annealing thereof.

As a result, the following findings were obtained: By adjusting the chemical composition, the silicon segregation rate and the surface roughness of an Fe-Ni alloy sheet for a shadow mask within prescribed ranges, it is possible to obtain an Fe-Ni alloy sheet for shadow mask, which is excellent in etching pierceability and permits certain prevention of sticking of the flat masks during the annealing thereof.

In addition, the following findings were also obtained: In order to certainly impart a prescribed surface roughness to an Fe-Ni alloy sheet for a shadow mask having a prescribed chemical composition and a prescribed silicon segregation rate, it suffices to prepare the above-mentioned alloy sheet, and impart the prescribed surface roughness onto the both surfaces of the alloy sheet with the use of a pair of dull rolls during the final cold rolling or the final temper rolling, i.e., during the final rolling carried out for the purpose of that preparation.

The present invention was made on the basis of the above-mentioned findings. Now, the Fe-Ni alloy sheet for a shadow mask of the present invention is described further in detail.

The chemical composition of the Fe-Ni alloy sheet for a shadow mask of the present invention is limited within the above-mentioned ranges for the following reasons.

(1) Nickel:

The Fe-Ni alloy sheet for a shadow mask is required to have the upper limit of about $2.0\times10^{6}/^\circ$ C. of an average thermal expansion coefficient in a temperature region of from 30° to 100° C. in order to prevent the occurrence of a color-phase shift. This thermal expansion coefficient depends upon the nickel content in the alloy sheet. The nickel content which satisfies the above-mentioned condition of the average thermal expansion coefficient is within a range of from 34 to 38 wt. %. The nickel content should therefore be limited within a range of from 34 to 38 wt. %.

(2) Silicon:

Silicon is an element effective for the prevention of sticking of the flat masks made from the Fe-Ni alloy sheet for a shadow mask during the annealing thereof. With a silicon content of under 0.01 wt. %, however, a silicon oxide film effective for preventing sticking of the flat masks is not formed on the surface of the flat mask. With a silicon content of over 0.15 wt. %, on the other hand, etching pierceability of the Fe-Ni alloy sheet is deteriorated. The silicon content should therefore be limited within a range of from 0.01 to 0.15 wt. %.

(3) Manganese:

Manganese has a function of improving deoxidation and hot workability of the Fe-Ni alloy sheet for a shadow mask. With a manganese content of under 0.01 wt. %, however, a desired effect as described above is not available. A manganese content of over 1.00 wt. % leads, on the other hand, to a larger thermal expansion coefficient of the Fe-Ni alloy sheet, which is not desirable in terms of a color-phase shift of the shadow mask. The manganese content should therefore be limited within a range of from 0.01 to 1.00 wt. %.

Even with a silicon content within the above-mentioned range, an excessively high silicon segregation rate on the surface portion of the Fe-Ni alloy sheet for a shadow mask results in a lower etching pierceability, and sticking of the flat masks occurs during the annealing thereof on part of the surface of the flat mask.

In order to prevent sticking of the flat masks, therefore, it is necessary, in addition to limiting the silicon content, to limit a silicon (Si) segregation rate, as represented by the following formula, of the surface portion of the Fe-Ni alloy sheet to up to 10%:

$$\left|\frac{\begin{pmatrix}\text{Si-concentration in}\\ \text{segregation region}\end{pmatrix}-\begin{pmatrix}\text{average Si}\\ \text{concentration}\end{pmatrix}}{(\text{Average Si concentration})}\right|\times 100.$$

After limiting the silicon segregation rate to up to 10% as described above, by limiting the minimum value of the silicon concentration in the unit surface portion of the Fe-Ni alloy sheet to at least 0.01 wt. % and the maximum value of the silicon concentration to up to 0.15 wt. %, it is possible to more certainly prevent local deterioration of etching pierceability of the alloy sheet and local sticking on part of the surface of the flat mask during the annealing thereof.

For the reduction of the silicon segregation rate to up to 10%, the following method is conceivable; Heating an alloy ingot or a continuously cast alloy slab to a temperature of 1,200° C. for 20 hours to soak same, then subjecting same to a primary slabbing-rolling at a sectional reduction rate of from 20 to 60%, then, heating the thus rolled slab to a temperature of 1,200° C. for 20 hours to soak same, then subjecting same to a secondary slabbing-rolling at a sectional reduction rate of from 30 to 50%, and slowly cooling same.

By subjecting the ingot or the slab to the working treatment and the heat treatment as described above, it is possible to reduce the silicon segregation rate of the Fe-Ni alloy sheet for a shadow mask.

In the heating before the primary slabbing-rolling and the secondary slabbing-rolling as described above, surface flaws of the slab after the slabbing-rolling can be minimized by reducing the sulfur content in the heating atmosphere to up to 80 ppm to inhibit embrittlement of the crystal grain boundary occurring during the heating.

The Fe-Ni alloy sheet for a shadow mask of the present invention is not limited to one manufactured through the process as described above alone, but may be one manufactured by the process known as a strip casting method which comprises casting an alloy sheet directly from a molten alloy, or one manufactured by applying a slight reduction in hot to the alloy stirp manufactured by the strip casting method.

By using the alloy sheet manufactured by the above-mentioned strip casting method, the process for reducing the silicon segregation rate through heating and soaking in the above-mentioned slabbing-rolling can be simplified to some extent.

For the purpose of improving etching pierceability of the Fe-Ni alloy sheet for a shadow mask, particularly the quality of the surface of the hole pierced by the etching, and minimizing contamination of the etching solution in the etching step to improve the etching operability, it is preferable to adjust the chemical composition of non-metallic inclusions contained in the Fe-Ni alloy sheet having the above-mentioned chemical composition to a chemical composition outside the region surrounded by a pentagon formed by connecting points ①, ②, $\bar{3}$, $\bar{4}$ and ⑤ in the $CaO$-$Al_2O_3$-$MgO$ ternary phase diagram shown in FIG. 1.

By thus adjusting the chemical composition of the non-metallic inclusions, the non-metallic inclusions in the Fe-Ni alloy sheet for a shadow mask become mainly comprised spherical non-metallic inclusions of up to 3 μm, and thus the amount of linear non-metallic inclusions having malleability in the rolling direction becomes very slight. As a result, this inhibits the formation of pits on the surface of the hole pierced by the etching, caused by the non-metallic inclusions, and minimizes the contamination of the etching solution caused by the entanglement of the non-metallic inclusions into the etching solution.

For the purpose of improving etching pierceability of the Fe-Ni alloy sheet for a shadow mask and certainly preventing sticking of the flat masks during the annealing thereof, it is necessary to limit a center-line mean roughness (Ra) of the alloy sheet within a range of from 0.3 to 0.7 μm, in addition to limiting the chemical composition and the silicon segregation rate of the alloy sheet within the ranges of the present invention, as described above. However, the center-line mean roughness (Ra) of under 0.3 μm leads to the occurrence of sticking of the flat masks during the annealing thereof and to a poor adherence of the photo mask onto the surface of the flat mask during the etching-piercing. The center-line mean roughness (Ra) of over 0.7 μm results, on the other hand, in a poorer etching pierceability of the alloy sheet even when the chemical composition and the silicon segregation rate of the alloy sheet are within the above-mentioned ranges. The center-line mean roughness (Ra) of the alloy sheet should therefore be limited within a range of from 0.3 to 0.7 μm.

The center-line mean roughness (Ra) represents the surface roughness as expressed by the following formula:

$$Ra = \frac{1}{L}\int_{O}^{L} |f(x)|\, dx$$

where,

L: measured length, and f(x): roughness curve.

In order to further improve etching pierceability of the Fe-Ni alloy sheet for a shadow mask and more certainly prevent sticking of the flat masks during the annealing thereof, it is necessary to limit a skewness (Rsk), which is another parameter representing the surface roughness of the alloy sheet, within an appropriate range, and to establish a specific relationship between the center-line mean roughness (Ra) and the skewness (Rsk), in addition to limiting the chemical composition, the silicon segregation rate and the center-line mean roughness (Ra) of the alloy sheet within the ranges of the present invention, as described above.

The skewness (Rsk) is a deviation in the height direction of the roughness curve, which represents the surface roughness as expressed by the following formula. According to the skewness (Rsk), even surfaces having the same center-line mean roughness (Ra) can be compared and identified with each other in terms of asymmetry of the surface shapes. More specifically, a surface shape containing more peaks leads to a positive value of skewness (Rsk), whereas a surface shape having more troughs, to a negative value of skewness (Rsk):

$$Rsk = \frac{1}{Rq^3}\int_{-\infty}^{\infty} Z^3 P(z)\, dz$$

$$Rq = \sqrt{\frac{1}{L}\int_{O}^{L} f(x)^2\, dx}$$

where, $$\int_{-\infty}^{\infty} Z^3 P(z)\, dz:$$

ternary moment of the amplitude distribution curve.

Now, the relationship between the center-line mean roughness (Ra) and the skewness (Rsk) of the Fe-Ni alloy sheet for shadow mask, which relationship permits further improvement of etching pierceability and more certain prevention of sticking of the flat masks during the annealing thereof is described with reference to FIG. 2.

Figure 2:
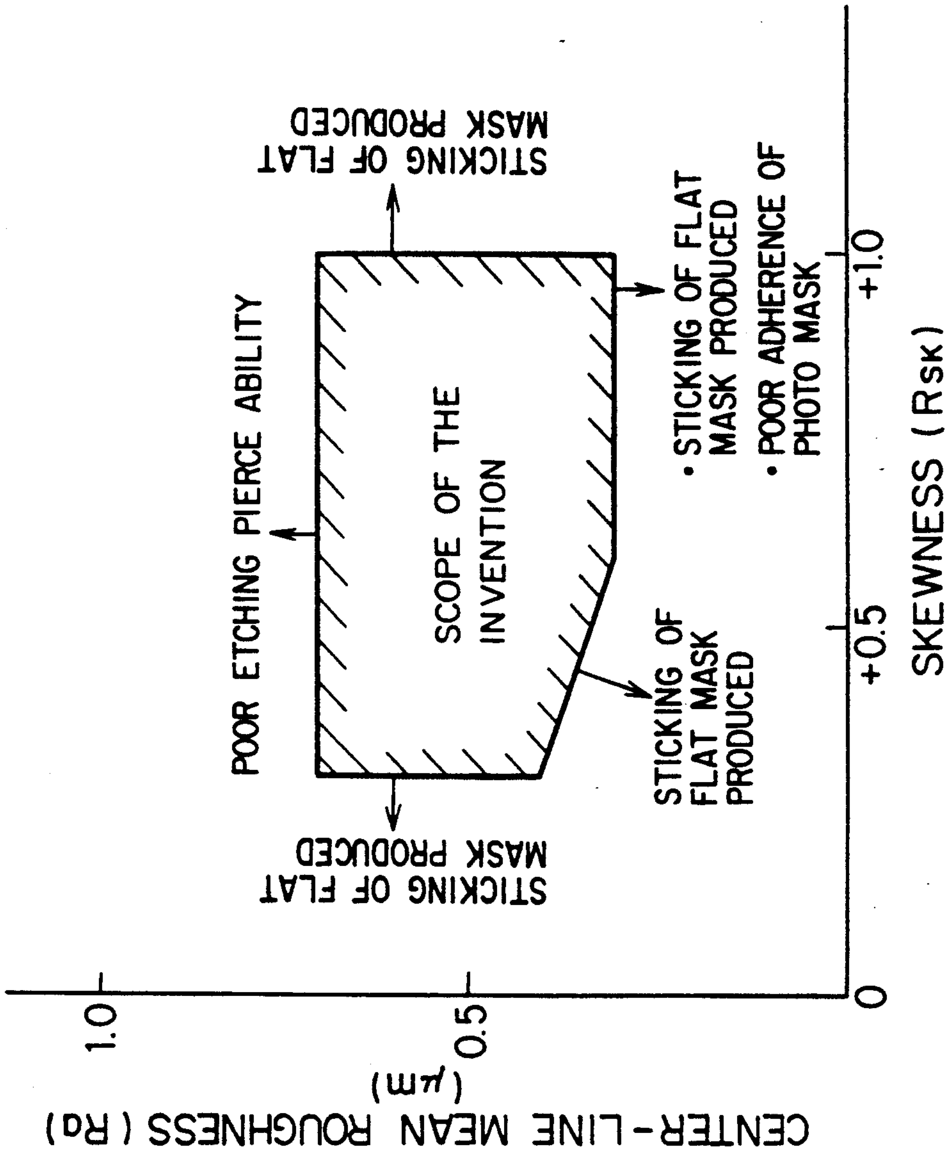
FIG. 2 is a graph illustrating the relationship between the center-line mean roughness (Ra) and the skewness (Rsk) of an Fe-Ni alloy sheet for a shadow mask, containing from 0.01 to 0.15 wt. % silicon and 0.0025 wt. % sulfur and having a silicon segregation rate of up to 10%, which relationship exerts an important effect on etching pierceability of the alloy sheet and sticking of the flat masks during the annealing thereof.

FIG. 2 is a graph illustrating the relationship between the center-line mean roughness (Ra) and the skewness (Rsk) of an Fe-Ni alloy sheet for a shadow mask, containing from 0.01 to 0.15 wt. % silicon and 0.0025 wt. % sulfur and having a silicon segregation rate of up to 10%, which relationship exerts an important effect on etching pierceability of the alloy sheet and sticking of the flat masks during the annealing thereof.

As is clear from FIG. 2, irrespective of the value of skewness (Rsk) of the Fe-Ni alloy sheet for a shadow mask, the center-line mean roughness (Ra) of the alloy sheet of under 0.3 μm results in occurrence of sticking of the flat masks during the annealing thereof over the entire surface of the flat mask and in a poorer adherence of the photo mask onto the surface of the flat mask during the etching-piercing, as described above. The center-line mean roughness (Ra) of the alloy sheet of over 0.7 μm leads, on the other hand, to a lower etching pierceability of the alloy sheet.

Even with the center-line mean roughness (Ra) of the Fe-Ni alloy sheet for a shadow mask within a range of from 0.3 to 0.7 μm, the skewness (Rsk) of the alloy sheet of under +0.3 causes sticking of the flat masks during the annealing thereof over the entire surface of the flat mask. With a value of skewness (Rsk) of the alloy sheet of over +1.0, on the other hand, sticking of the flat masks occurs during the annealing thereof on part of the surface of the flat mask.

In addition, when the center-line mean roughness (Ra) and the skewness (Rsk) of the Fe-Ni alloy sheet for a shadow mask satisfy the following formula, sticking of the flat masks occurs during the annealing thereof over the entire surface of the flat masks.

$$Ra < -\tfrac{1}{3}Rsk + 0.5$$

As is clear from FIG. 2, therefore, in order to further improve etching pierceability of the Fe-Ni alloy sheet for a shadow mask and more certainly prevent sticking of the flat masks during the annealing thereof, it is necessary, in addition to limiting the chemical composition, the silicon segregation rate and the center-line mean roughness (Ra) as described above, to limit the skewness (Rsk) of the alloy sheet within a range of from +0.3 to +1.0 μm and to establish a relationship between the centerline mean roughness (Ra) and the skewness (Rsk) so as to satisfy the following formula:

$$Ra \geqq -\frac{1}{3}Rsk+0.5$$

It is thus possible to further improve etching pierceability of the Fe-Ni alloy sheet for a shadow mask and more certainly prevent sticking of the flat masks during the annealing thereof In order to reduce the production cost of the alloy sheet while preventing sticking of the flat masks even by increasing the number of flat masks piled up in a single run of the annealing, the surface roughness in two directions of the alloy sheet should satisfy the following formulae, in addition to limiting the above-mentioned surface roughness:

$$|Ra(L)-Ra(C)| \leqq 0.1\ \mu m, \text{ and}$$

$$|Rsk(L)-Rsk(C)| \leqq 0.2$$

where,

Ra(L): center-line mean roughness of the alloy sheet in the rolling direction,

Ra(C): center-line mean roughness of the alloy sheet in the crosswise direction to the rolling direction, Rsk(L): skewness of the alloy sheet in the rolling direction, and Rsk(C): skewness of the alloy sheet in the crosswise direction to the rolling direction.

In order to further improve etching pierceability of the Fe-Ni alloy sheet for a shadow mask and more certainly prevent sticking of the flat masks during the annealing thereof, it is necessary to limit an average peak interval (Sm), which is another parameter representing the surface roughness of the alloy sheet, within an appropriate range, in addition to limiting the chemical composition, the silicon segregation rate, the center-line mean roughness (Ra), and skewness (Rsk) of the alloy sheet within appropriate ranges, and establishing a specific relationship between the center-line mean roughness (Ra) and the skewness (Rsk) of the alloy sheet, as described above.

However, the average peak interval (Sm) of the Fe-Ni alloy sheet for a shadow mask of under 70 μm results in the occurrence of sticking of the flat masks during the annealing thereof. The average peak interval (Sm) of over 160 μm leads, on the other hand, to a poorer etching pierceability of the alloy sheet. The average peak interval (Sm) of the alloy sheet should therefore be limited within a range of from 70 to 160 μm.

The average peak interval (Sm) is a surface roughness of a sectional curve, as expressed by the following formula:

$$Sm = \frac{Sm_1 + Sm_2 + \ldots + Sm_n}{n}$$

where, $Sm_1$, $Sm_2$: peak interval, and n: number of peaks.

Now, in the case where the average peak interval (Sm) of the Fe-Ni alloy sheet for a shadow mask is limited within the range of from 70 to 160 μm, the relationship between the center-line mean roughness (Ra) and the skewness (Rsk) of the alloy sheet, which relationship has an effect on etching pierceability of the alloy sheet and sticking of the flat masks during the annealing thereof, is described with reference to FIG. 3.

Figure 3:
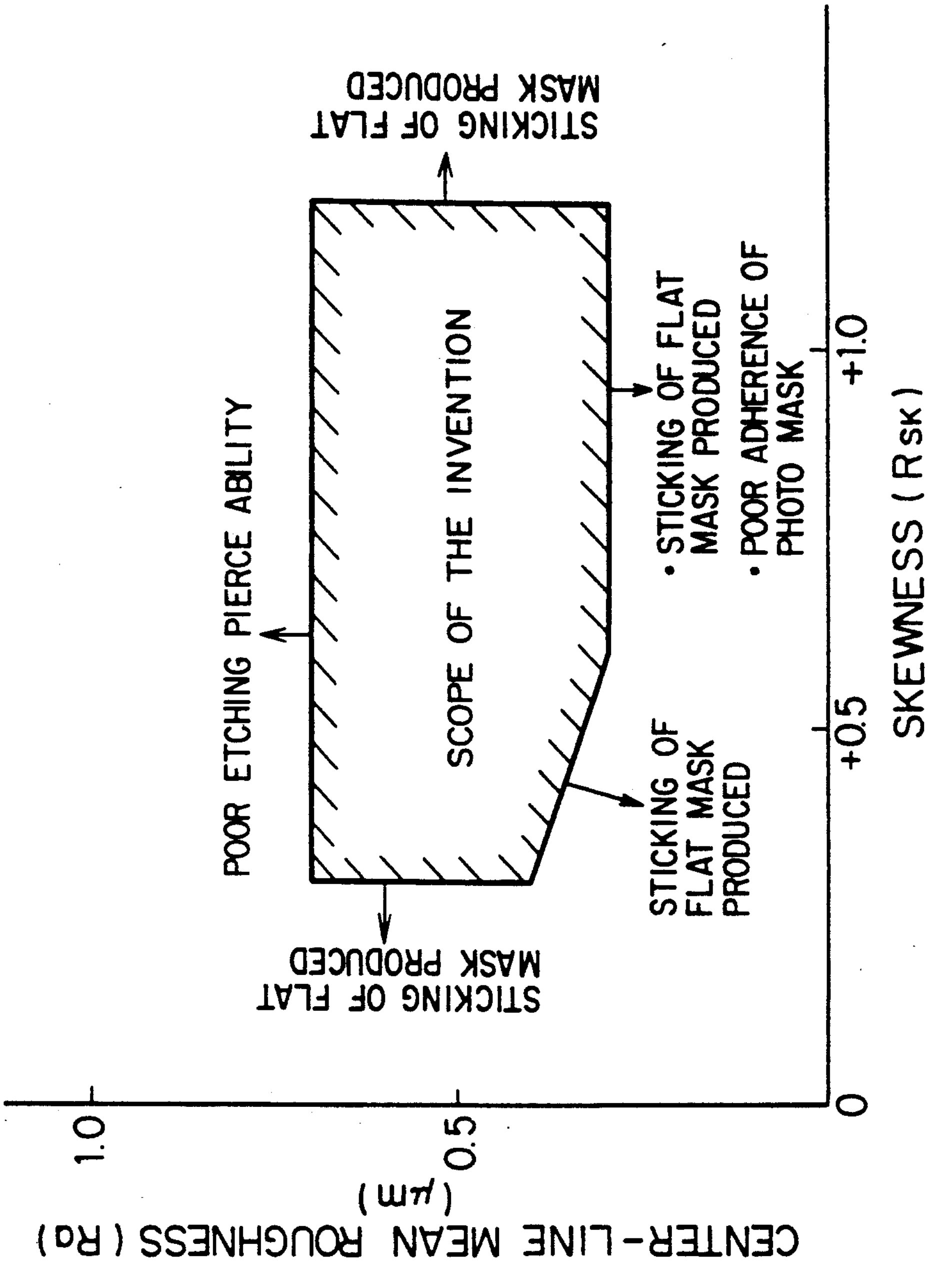
FIG. 3 is a graph illustrating the relationship between the center-line mean roughness (Ra) and the skewness (Rsk) of an Fe-Ni alloy sheet for a shadow mask, containing from 0.01 to 0.15 wt. % silicon and 0.0025 wt. % sulfur, and having a silicon segregation rate of up to 10% and an average peak interval (Sm) of 70 to 160 μm, which relationship exerts an important effect on etching pierceability of the alloy sheet and sticking of the flat masks during the annealing thereof.

FIG. 3 is a graph illustrating the relationship between the center-line mean roughness (Ra) and the skewness (Rsk) of an Fe-Ni alloy sheet for a shadow mask, containing from 0.01 to 0.15 wt. % silicon and 0.0025 wt. % sulfur, and having a silicon segregation rate of up to 10% and an average peak interval (Sm) of from 70 to 160 μm, which relationship exerts an important effect on etching pierceability of the alloy sheet and sticking of the flat masks during the annealing thereof.

As is clear from FIG. 3, irrespective of the value of skewness (Rsk) of the Fe-Ni alloy sheet for a shadow mask, the center-line mean roughness (Ra) of the alloy sheet of under 0.3 μm results in the occurrence of sticking of the flat masks during the annealing thereof and in a poorer adherence of the photo mask onto the surface of the flat mask during the etching-piercing, as described above. The center-line mean roughness (Ra) of the alloy sheet of over 0.7 μm leads, on the other hand, to a lower etching pierceability of the alloy sheet.

Even with the center-line mean roughness (Ra) of the Fe-Ni alloy sheet for a shadow mask within a range of from 0.3 to 0.7 μm, the skewness (Rsk) of the alloy sheet of under +0.3 causes sticking of the flat masks during the annealing thereof. With a value of skewness (Rsk) of the alloy sheet of over +1.2, on the other hand, sticking of the flat masks occurs during the annealing thereof on part of the surface of the flat mask.

In addition, when the center-line mean roughness (Ra) and the skewness (Rsk) of the Fe-Ni alloy sheet for a shadow mask satisfy the following formula, sticking of the flat masks occurs during the annealing thereof:

$$Ra < -\frac{1}{3}Rsk+0.5$$

As is clear from FIG. 3, therefore, in order to further improve etching pierceability of the Fe-Ni alloy sheet for a shadow mask and more certainly prevent sticking of the flat masks during the annealing thereof, it is necessary, in addition to limiting the chemical composition, silicon segregation rate and the center-line mean roughness (Ra) of the alloy sheet as described above, to limit the skewness (Rsk) of the alloy sheet within a range of from +0.3 to +1.2, to establish the relationship between the center-line mean roughness (Ra) and the skewness (Rsk) of the alloy sheet so as to satisfy the following formula, and furthermore, to limit the average peak interval (Sm) within a range of from 70 to 160 μm:

$$Ra \geqq -\frac{1}{3}Rsk+0.5$$

By limiting the average peak interval (Sm) of the Fe-Ni alloy sheet for a shadow mask within a range of from 70 to 160 μm, it is possible, as described above, to increase the upper limit value of the skewness (Rsk), which causes the occurrence of sticking of the flat masks during the annealing thereof on part of the surface of the flat mask, than in the case where the peak interval (Sm) is not limited, and in addition, to alleviate the degree of occurrence of sticking of the flat masks during the annealing thereof even when the values of the centerline mean roughness (Ra) and the skewness (Rsk) are outside the respective ranges of the present invention.

When the values of the center-line mean roughness (Ra) and the skewness (Rsk) in two directions of the Fe-Ni alloy sheet for a shadow mask satisfy the above-mentioned formulae, it is possible, as described above, to reduce the occurrence of sticking of the flat masks during the annealing thereof. In order to further improve etching pierceability of the alloy sheet, the values of the average peak interval (Sm) in two directions should satisfy the following formula:

$$|Sm(L)-Sm(C)| \leq 5.0\ \mu m$$

where,

Sm(L): average peak interval of the alloy sheet in the rolling direction, and

Sm(C): average peak interval of the alloy sheet in the crosswise direction to the rolling direction.

In order to raise the critical annealing temperature at which sticking of the flat masks made of the Fe-Ni alloy sheet for a shadow mask occurs during the annealing thereof, reduction of the sulfur content in the alloy sheet is effective, in addition to limiting the chemical composition, the silicon segregation rate and the surface roughness of the alloy sheet as described above.

Figure 4:
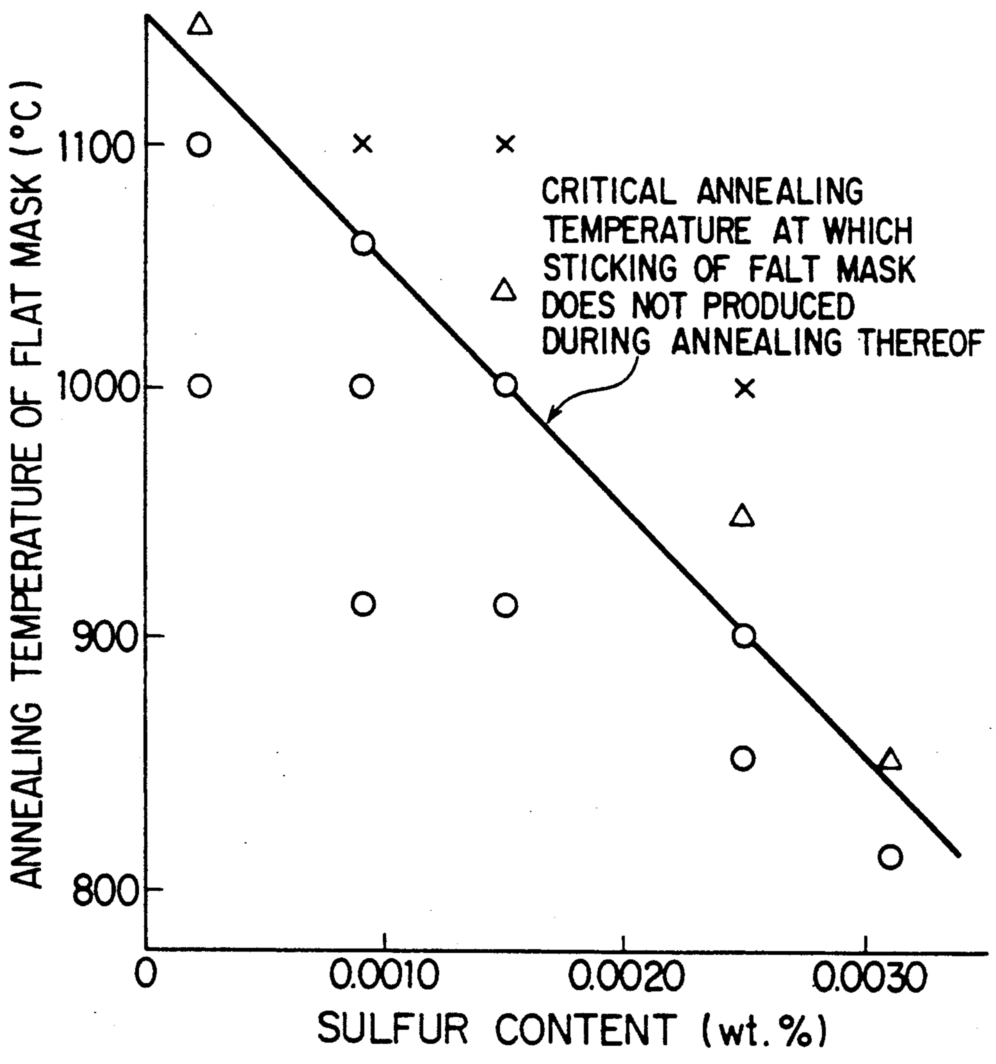
FIG. 4 is a graph illustrating the relationship between the annealing temperature and the sulfur content of an Fe-Ni alloy sheet for a shadow mask, which relationship exerts an important effect on sticking of the flat masks made of the alloy sheet during the annealing thereof.

FIG. 4 is a graph illustrating the relationship between the sulfur content and the annealing temperature of an Fe-Ni alloy sheet for a shadow mask having the chemical composition, the silicon segregation rate, the center-line mean roughness (Ra) and the skewness (Rsk), all within the scope of the present invention, which relationship exerts an important effect on sticking of the flat masks made of the alloy sheet during the annealing thereof, in the case where 30 flat masks are piled up and annealed.

In FIG. 4, the mark "x" indicates occurrence of sticking of the flat masks over the entire surface of the flat mask, the mark "Δ" indicates occurrence of sticking of the flat masks on a part of the surface of the flat mask, and the mark "o" indicates non-occurrence of sticking of the flat masks.

As is clear from FIG. 4, it is possible to raise the critical annealing temperature at which sticking of the flat masks occurs during the annealing thereof, by reducing the sulfur content in the Fe-Ni alloy sheet for a shadow mask.

The mechanism of the above-mentioned effect brought about by the reduction of the sulfur content in the alloy sheet is not clearly known, but is conjectured to be attributable to the concurrence of the formation on the surface of the flat mask of a silicon oxide film effective for the prevention of sticking of flat masks, and the precipitation of sulfur onto the surface of the flat mask, during the annealing of the flat masks made of the Fe-Ni alloy sheet for a shadow mask.

The Fe-Ni alloy sheet for a shadow mask of the present invention is manufactured by preparing a material sheet having the chemical composition and the silicon segregation rate described above, and imparting a prescribed surface roughness mentioned above to the both surfaces of the material sheet by means of a pair of dull rolls during the final rolling, i.e., during the final cold rolling or the final temper rolling.

The above-mentioned dull roll can be obtained by imparting a prescribed surface roughness to a material roll by means of the electrospark working or the laser working, or more preferably, the shot blasting.

When the shot blasting is employed, it is desirable to use the steel grit as the shot having a particle size within a range of from No. 120 (JIS symbol: G120) to No. 240 (JIS symbol: G240), and a hardness (Hv) within a range of from 400 to 950 and to set a relatively low shooting energy of the steel grit onto the roll surface for the No. 120 steel grit, and a relatively high shooting energy for the No. 240 steel grit.

The material roll before surface-working for preparing the dull roll should preferably have a hardness (Hs) of from 85 to 95, a diameter of from 100 to 125 mm, a center-line mean roughness (Ra) of up to 0.1 μm, and a skewness (Rsk) of under 0.

Under the above-mentioned conditions, a plurality of dull rolls are manufactured from the respective material rolls by the shot blasting, with such surface roughness values as a center-line mean roughness (Ra) within a range of from 0.4 to 0.9 μm and a skewness (Rsk) of under −0.2, or more preferably, under −0.5, and as required an average peak interval (Sm) within a range of from 40 to 200 μm.

The above-mentioned dull rolls are incorporated into a final cold rolling mill or a final temper rolling mill, and a prescribed surface roughness is imparted to the surface of a material sheet for the Fe-Ni alloy sheet for a shadow mask. In order to accurately impart the prescribed surface roughness to the surface of the material sheet by means of the dull rolls, the material sheet is passed through the dull rolls at least twice, with a reduction rate of at least 10% per pass.

When imparting the surface roughness to the material sheet by means of the dull rolls, a rolling oil having a viscosity within a range of from 7 to 8 cst at a temperature within a range of from 10 to 50° C is used, and this rolling oil is supplied onto the surfaces of the dull rolls under an amount within a range of from 0.1 to 0.5 $kg/cm^2$. The supply amount of the rolling oil is limited to the above-mentioned range because, with a supply amount of the rolling oil of under 0.1 $kg/cm^2$, a prescribed surface roughness is not imparted to the surface of the material sheet, and with a supply amount of the rolling oil of over 0.5 $kg/cm^2$, irregularities are caused in the surface roughness imparted to the material sheet.

Preferable rolling conditions by the dull rolls include a rolling speed within a range of from 30 to 200 m/minute, a tension of the material sheet within a range of from 15 to 45 $kg/mm^2$ on the downstream side in the rolling direction of the dull rolls, a tension of the material sheet within a range of from 10 to 40 kg./$mm^2$ on the upstream side in the rolling direction of the dull rolls, and a reduction force per unit sheet width within a range of from 0.15 to 0.25 tons/mm. The tension of the material sheet during the rolling thereof by means of the dull rolls is set within the ranges as described above because this enables to increase flatness of the Fe-Ni alloy sheet for a shadow mask.

The prescribed surface roughness is imparted to the material sheet as described above. Prior to imparting the prescribed surface roughness to the material sheet, the material sheet may be subjected to an intermediate annealing to decrease hardness of the material sheet, or to a stress relieving annealing to remove a residual stress in the material sheet after imparting the prescribed surface roughness to the material sheet.

The intermediate annealing and the stress relieving annealing described above are applied in a continuous annealing furnace for soft steel having a gaseous atmosphere with a hydrogen concentration within a range of from 5 to 15% and a dew point within a range of from −10° to −30° C., or in a bright annealing furnace having a gaseous atmosphere with a hydrogen concentration within a range of from 15 to 100% and a dew point within a range of from −20° to −60° C.

Now, the present invention is described further in detail by means of examples.

EXAMPLE 1

Ingots each weighing seven tons were prepared by the ladle refining, which comprised alloys A to E, respectively, each having the chemical composition as shown in Table 1 and containing non-metallic inclusions having the chemical composition as shown in Table 2.

The finished slab comprising the alloy A, from which the alloy sheet No. 2 was manufactured, was prepared, unlike the above-mentioned preparation of the finished slabs, by heating the ingot at a temperature of 1,200° C for 15 hours to soak same, subjecting the ingot to a slabbing-rolling at a sectional reduction of 78% to prepare a slab, and slowly cooling same.

The manufacturing method of the above-mentioned alloy sheets Nos. 1 to 10 is described further in detail below.

First, each of the slabs was scarfed, and an anti-oxidation agent was applied onto the surface of the slab. Then, the slab was heated to a temperature of 1,100° C. and hot-rolled to prepare a hot-rolled coil under the hot-rolling conditions including a total reduction rate of

TABLE 1

| | Chemical composition (wt. %) | | | | | | | | | |
|---|---|---|---|---|---|---|---|---|---|---|
| Alloy | Ni | Mn | Si | S | C | P | Cr | sol.Al | N | O |
| A | 35.7 | 0.28 | 0.05 | 0.0005 | 0.0019 | 0.002 | 0.02 | 0.007 | 0.0012 | 0.0010 |
| B | 35.5 | 0.29 | 0.08 | 0.0025 | 0.0015 | 0.002 | 0.05 | 0.008 | 0.0013 | 0.0014 |
| C | 35.8 | 0.30 | <0.01 | 0.0015 | 0.0020 | 0.002 | 0.03 | 0.006 | 0.0021 | 0.0021 |
| D | 35.9 | 0.40 | 0.18 | 0.0012 | 0.0025 | 0.002 | 0.03 | 0.008 | 0.0015 | 0.0028 |
| E | 36.0 | 0.29 | 0.02 | 0.0006 | 0.0037 | 0.003 | 0.01 | 0.010 | 0.0009 | 0.0011 |

TABLE 2

| | Chemical composition of non-metallic inclusions (wt. %) | | | Distribution of non-metallic inclusions (number/$mm^2$) | | | | | |
|---|---|---|---|---|---|---|---|---|---|
| | | | | Thickness of spherical inclusions in sheet thickness direction (μm) | | | | Thickness of linear inclusions in sheet thickness direction (μm) | |
| Alloy | CaO | $Al_2O_3$ | MgO | Under 3 | 3~6 | 6~14 | Over 14 | Under 3 | 3~5 |
| A | 55 | 5 | 40 | 7 | 0 | 0 | 0 | 0 | 0 |
| B | 15 | 60 | 25 | 13 | 1 | 0 | 0 | 0 | 0 |
| C | 10 | 0 | 90 | 14 | 0 | 0 | 0 | 0 | 0 |
| D | 25 | 5 | 70 | 16 | 0 | 0 | 0 | 0 | 0 |
| E | 40 | 35 | 25 | 10 | 0 | 0 | 0 | 0 | 0 |

Figure 5:
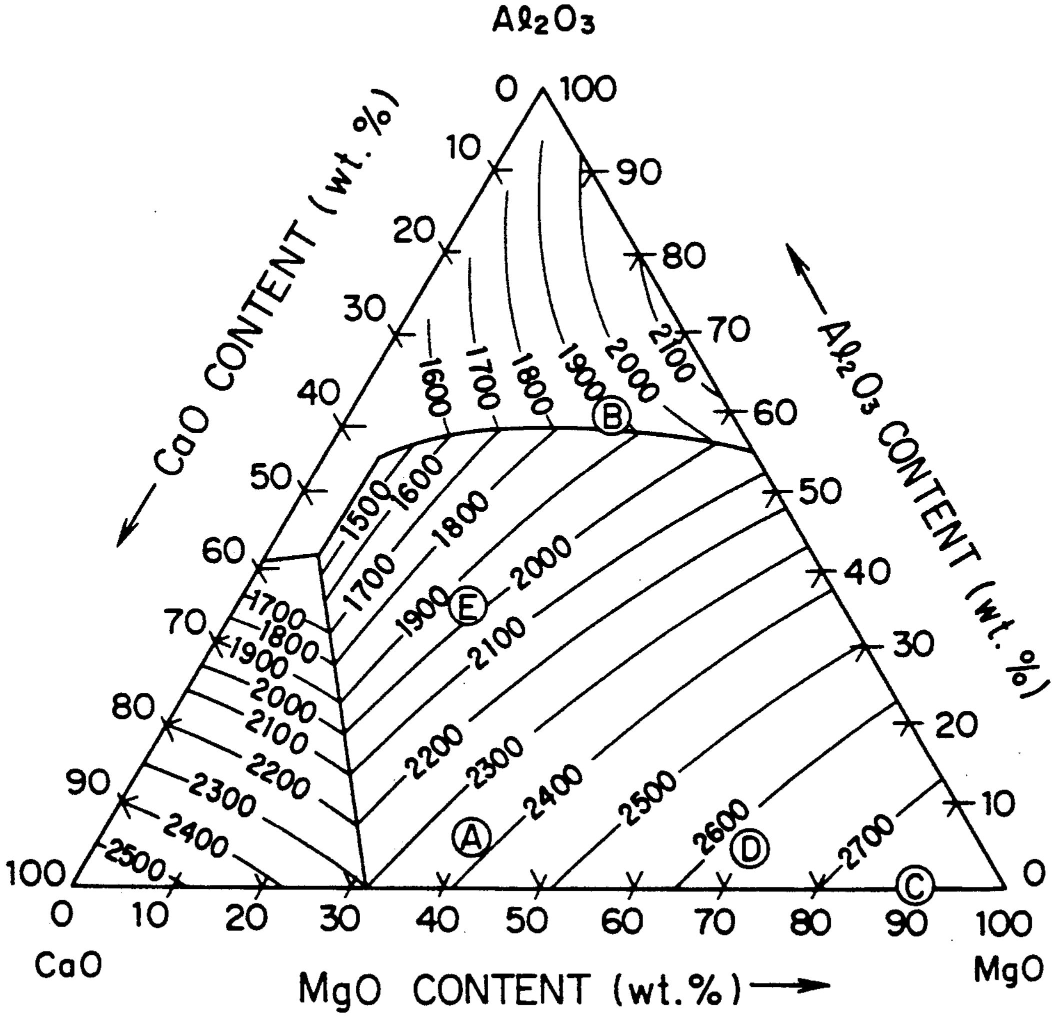
FIG. 5 is the $CaO$-$Al_2O_3$-$MgO$ ternary phase diagram illustrating the chemical composition of non-metallic inclusions contained in each of the alloys A to E used in the Examples of the present invention.

FIG. 5 is the $CaO-Al_2O_3-MgO$ ternary phase diagram illustrating the chemical compositions of non-metallic inclusions contained in each of the alloys A to E.

The ladle used in the ladle refining of the above-mentioned ingots comprised an MgO-CaO refractory containing up to 40 wt. % CaO, and the molten slag used was a $CaO-Al_2O_3-MgO$ slag having a ratio of $(CaO)/\{(CaO)+(Al_2O_3)\}$ of at least 0.45, and containing up to 0.25 wt. % MgO, up to 15 wt. % $SiO_2$, and up to 3 wt. % oxide of a metal having an oxygen affinity lower than that of silicon.

Then, each of the thus prepared ingots was scarfed, heated at a temperature of 1,200° C. for 20 hours to soak same, and subjected to a primary slabbing-rolling at a sectional reduction of 60% to prepare a slab. Then, each of the thus prepared slab was heated at a temperature of 1,200° C. for 20 hours to soak same, subjected to a secondary slabbing-rolling at a sectional reduction rate of 45%, and slowly cooled to prepare a finished slab. From each of the thus prepared finished slabs comprising the alloys A to E, Fe-Ni alloy sheets for a shadow mask Nos. 1 to 10 as shown in Table 3 were manufactured, respectively, in accordance with a method described later. More specifically, the alloy sheets Nos. 1 to 6 were manufactured from the slab comprising the alloy A; the alloy sheet No. 7 was manufactured from the slab comprising the alloy B; the alloy sheet No. 8 was manufactured from the slab comprising the alloy C; the alloy sheet No. 9 was manufactured from the slab comprising the alloy D; and the alloy sheet No. 10 was manufactured from the slab comprising the alloy E.

82% at a temperature of at least 1,000° C., a total reduction rate of 98% at a temperature of at least 850° C., and a coiling temperature of the hot-rolled coil within a range of from 550° to 750° C.

Each of the thus prepared hot-rolled coils was descaled, and subjected to repeated cycles of a cold rolling and an annealing to prepare a material sheet for the Fe-Ni alloy sheet for a shadow mask. Upon the final temper rolling, a surface roughness as shown in Table 3 was imparted by means of dull rolls described later, which were incorporated in the temper rolling mill, to the both surfaces of each of the material sheets, thereby manufacturing each of the Fe-Ni alloy sheets for a shadow mask Nos. 1 to 10 having a thickness of 0.25 mm.

The distribution of non-metallic inclusions contained in each of the thus manufactured alloy sheets Nos. 1 to 10 is shown in Table 2 for each of the alloys A to E, together with the chemical composition of non-metallic inclusions.

As is clear from Table 2, non-metallic inclusions contained in each of the alloys A to E had a melting point of at least 1,600° C., and mainly comprised spherical inclusions having a thickness of up to 3 μm.

This inhibited the formation of pits on the hole surface caused by non-metallic inclusions during etching-piercing of the alloy sheet, and almost eliminated the problem of contamination of the etching solution caused by the entanglement of linear non-metallic inclusions into the etching solution.

The above-mentioned distribution of the non-metallic inclusions was evaluated by the following method; Enlarging the section of the alloy sheet along the rolling direction to 800 magnifications through a microscope, and measuring a thickness in the sheet thickness direction and a length in the rolling direction of all non-metallic inclusions within the field of vision. The measured sections had a total area of 60 $mm^2$. The values of thickness of the spherical inclusions and the linear inclusions in the sheet thickness direction were classified by size to evaluate the above-mentioned distribution in terms of the number of inclusions as described above per $mm^2$.

The spherical inclusions are those having a ratio of length to thickness of inclusions of up to 3, i.e., (length/thickness)$\leq$3, and the linear inclusions are those having a ratio of length to thickness of inclusions of over 3, i.e., (length/thickness)>3.

The dull roll was manufactured as follows: Steel grits having a particle size of No. 120 (JIS symbol: G120) and a hardness (Hv) within a range of from 400 to 950 were shot by the shot blasting onto the surfaces of a material roll with a smooth surfaces made of SKH (JIS symbol:G4403) and having a hardness (Hv) of 90 and a diameter of 120 mm, thereby manufacturing, from the respective material rolls, a plurality of dull rolls having a surface roughness including a center-line mean roughness (Ra) within a range of from 0.30 to 0.85 μm and a skewness (Rsk) within a range of from −0.2 to −1.1.

For rolling of the Fe-Ni alloy sheet by means of the above-mentioned dull rolls, the reduction rate for the first pass of the alloy sheet was set at 18.6%, the reduction rate for the second pass was set at 12.3%, and the total reduction rate was set at 28.6%. A rolling oil having a viscosity of 7.5 cst was employed with a supply amount of rolling oil of 0.4 kg/$cm^2$. The other rolling conditions included a rolling speed of 100 m/minute, a tension of the alloy sheet of 20 kg/$mm^2$ on the downstream side in the rolling direction of the dull rolls, a tension of the alloy sheet of 15 kg/$mm^2$ on the upstream side in the rolling direction of the dull rolls, and a reduction force per unit sheet width of 0.20 tons/mm.

The silicon segregation rate in the surface portion of each of the Fe-Ni alloy sheets was investigated by means of a mapping analyzer based on the EPMA (abbreviation of Electron Probe Micro Analyzer).

A flat mask was manufactured by forming holes on each of the alloy sheets Nos. 1 to 10 through the etching-piercing to investigate etching pierceability, and the surfaces of the holes formed by the etching-piercing were observed by means of a scanning type electron microscope to investigate the presence of pits on the hole surfaces. Contamination of the etching solution was evaluated on the basis of the μmount of residues remaining in the etching solution after the etching-piercing. Then, 30 flat masks were piled up and annealed at a temperature of 900° C. to investigate the occurrence of sticking of the flat masks.

The rusults are shown in Table 3.

TABLE 3

| Alloy | Alloy sheet No. | Si segregation rate (%) | Surface roughness Ra (L) (μm) | Ra (C) (μm) | Rsk (L) | Rsk (C) | \|Ra(L) − Ra(C)\| (μm) | \|Rsk(L) − Rsk(C)\| | (Ra) + ⅓ (Rsk) − 0.5 | Etching pierce-ability | Sticking during annealing | Pits on hole surface | Etching solution contamination |
|---|---|---|---|---|---|---|---|---|---|---|---|---|---|
| A | 1 | 4 | 0.50 | 0.60 | +0.6 | +0.7 | 0.10 | 0.1 | Positive | ○ | ○ | None | Very slight |
| | 2 | 16 | 0.60 | 0.70 | +0.8 | +0.9 | 0.10 | 0.1 | Positive | Δ | Δ | | |
| | 3 | 7 | 0.80 | 0.85 | +0.7 | +0.5 | 0.05 | 0.2 | Positive | X | ○ | | |
| | 4 | 5 | 0.30 | 0.40 | +0.5 | +0.6 | 0.10 | 0.1 | Negative | ○ | X | | |
| | 5 | 5 | 0.60 | 0.65 | +0.2 | +0.2 | 0.05 | 0.0 | Positive | ○ | X | | |
| | 6 | 6 | 0.50 | 0.65 | +1.2 | +1.1 | 0.15 | 0.1 | Positive | ○ | Δ | | |
| B | 7 | 7 | 0.60 | 0.60 | +0.9 | +0.8 | 0.00 | 0.1 | Positive | ○ | ○ | None | Very slight |
| C | 8 | 2 | 0.55 | 0.65 | +0.7 | +0.7 | 0.10 | 0.0 | Positive | ○ | X | None | Very slight |
| D | 9 | 9 | 0.50 | 0.65 | +0.5 | +0.6 | 0.15 | 0.1 | Positive | X | ○ | None | Very slight |
| E | 10 | 2 | 0.55 | 0.60 | +1.0 | +1.0 | 0.05 | 0.0 | Positive | ○ | ○ | None | Very slight |

In Table 3, the evaluation of the center-line mean roughness (Ra) was based on whether or not both Ra(L) and Ra(C) satisfied the scope of the present invention. This was also the case with the evaluation of the skewness (Rsk) and the average peak interval (Sm) described later. In these columns of Table 3, (L) represents the measured values in the rolling direction, and (C) represents the measured values in the crosswise direction to the rolling direction. When calculating "(Ra)+⅓(Rsk)−0.5", the measured values in the above-mentioned (L) and those in the above-mentioned (C), whichever the smaller were adopted as the values of the center-line mean roughness (Ra) and the skewness (Rsk). This applied also for all the other examples presented hereafter.

In the column of "Etching pierceability" in Table 3, the mark "◎" represents the case where the diameter and the shape of the hole formed by the etching-piercing are perfectly free from irregularities and etching pierceability is very excellent; the mark "o" represents the case where the diameter and the shape of the hole formed by the etching-piercing show slight irregularities, with however no practical difficulty and etching pierceability is excellent; the mark "Δ" represents the case where irregularities are produced in the hole diameter and the hole shape; and the mark "x" represents a case where serious irregularities are produced in the hole diameter and the hole shape. This evaluation applies also for all the other examples presented hereafter.

In the column of "Sticking during annealing" in Table 3, the mark "o" represents non-occurrence of sticking of the flat masks; the mark "Δ" represents the occurrence of sticking of the flat mask on part of the surface thereof; and the mark "x" represents the occurrence of sticking of the flat mask over the entire surface thereof. This evaluation applies also for all the other examples presented hereafter.

As is clear from Table 3, the alloy sheets Nos. 1, 7 and 10 have a silicon content, a silicon segregation rate, a center-line mean roughness (Ra), a skewness (Rsk) and a value of "(Ra)+⅓(Rsk)−0.5", all within the scope of the present invention.

These alloy sheets Nos. 1, 7 and 10 are therefore excellent in etching pierceability and no sticking of the flat masks occurs during the annealing thereof.

In the alloy sheets Nos. 2, 8 and 9, in contrast, although the surface roughness is within the scope of the present invention, the silicon segregation rate is large outside the scope of the present invention for the alloy sheet No. 2; the silicon content is small outside the scope of the present invention for the alloy sheet No. 8; and the silicon content is large outside the scope of the present invention for the alloy sheet No. 9.

The alloy sheet No. 2 has therefore a slightly poor etching pierceability, with occurrence of sticking of the flat mask on part of the surface thereof; the alloy sheet No. 8, while being excellent in etching pierceability, suffers from sticking of the flat mask over the entire surface thereof; and the alloy sheet No. 9 has a low etching pierceability, with no occurrence of sticking of the flat mask.

In the alloy sheets Nos. 3 to 6, although the silicon content and the silicon segregation rate are all within the scope of the present invention, the center-line mean roughness (Ra) is large outside the scope of the present invention for the alloy sheet No. 3; the value of "(Ra)+½(Rsk)−0.5" is negative for the alloy sheet No. 4; the skewness (Rsk) is small outside the scope of the present invention for the alloy sheet No. 5; and the skewness (Rsk) is large outside the scope of the present invention for the alloy sheet No. 6.

The alloy sheet No. 3 has therefore a low etching pierceability with no occurrence of sticking of the flat sheet No. 1; the alloy sheet No. 16 was manufactured from the hot-rolled coil for the alloy sheet No. 7; and the alloy sheet No. 17 was manufactured from the hot-rolled coil for the alloy sheet No. 10.

The dull rolls had a surface roughness varying with each of the above-mentioned alloy sheets, and were manufactured in the same manner as in Example 1, with a center-line mean roughness (Ra) within a range of from 0.45 to 0.70 μm and a skewness (Rsk) within a range of from −0.4 to −1.1.

Investigation of the silicon segregation rate for each of the alloy sheets Nos. 11 to 17, which was carried out in the same manner as in Example 1, revealed that the silicon segregation rate was within a range of from 4 to 7% in all cases. Then, a flat mask was manufactured by forming holes on each of the alloy sheets Nos. 11 to 17 through the etching-piercing to investigate etching pierceability in the same manner as in Example 1. In addition, 50 flat masks were piled up and annealed at a temperature shown in Table 4 to investigate the occurrence of sticking of the flat masks during the annealing thereof.

The results of these tests are shown in Table 4.

The rolling condition of the ingot and the slab and other conditions were the same as in Example 1.

TABLE 4

| | | | Surface roughness | | | | | | | | | |
|---|---|---|---|---|---|---|---|---|---|---|---|---|
| Alloy | Alloy sheet No. | Si segregation rate (%) | Ra (L) (μm) | Ra (C) (μm) | Rsk (L) | Rsk (C) | \|Ra(L) − Ra(C)\| (μm) | \|Rsk(L) − Rsk(C)\| | (Ra) + ½ (Rsk) − 0.5 | Etching pierce-ability | Sticking during annealing | Annealing temperature (°C.) |
| A | 11 | 4 | 0.50 | 0.60 | +0.6 | +0.7 | 0.10 | 0.1 | Positive | ○ | ○ | 950 |
| | 12 | 6 | 0.50 | 0.70 | +0.5 | +0.6 | 0.20 | 0.1 | Positive | ○ | Δ | 950 |
| | 13 | 7 | 0.55 | 0.65 | +0.5 | +0.8 | 0.10 | 0.3 | Positive | ○ | Δ | 950 |
| | 14 | 7 | 0.45 | 0.65 | +0.4 | +0.7 | 0.20 | 0.3 | Positive | ○ | X | 950 |
| | 15 | 7 | 0.45 | 0.65 | +0.4 | +0.7 | 0.20 | 0.3 | Positive | ○ | ○ | 850 |
| B | 16 | 4 | 0.60 | 0.60 | +0.9 | +0.8 | 0.00 | 0.1 | Positive | ○ | Δ | 950 |
| E | 17 | 2 | 0.55 | 0.60 | +1.0 | +1.0 | 0.05 | 0.0 | Positive | ○ | ○ | 950 |

mask; the alloy sheets Nos. 4 and 5, while being excellent in etching pierceability, suffer from sticking of the flat mask over the entire surface thereof; and the alloy sheet No. 6, while being excellent in etching pierceability, shows sticking of the flat mask on part of the surface thereof.

These observation suggest that, in order to obtain an Fe-Ni alloy sheet for a shadow mask, which is excellent in etching pierceability and free from sticking of the flat masks during the annealing thereof, it is necessary to limit the center-line mean roughness (Ra) and the skewness (Rsk) within the scope of the present invention, in addition to limiting the silicon content and the silicon segregation rate within the scope of the present invention.

EXAMPLE 2

A material sheet for the Fe-Ni alloy sheet for a shadow mask was prepared by repeating a cycle comprising a cold rolling and an annealing in the same manner as in Example 1 by the use of the respective hot-rolled coils from which the alloy sheets Nos. 1, 7 and 10 were prepared in Example 1. Then, upon the final temper rolling, a surface roughness as shown in Table 4 was imparted to the both surfaces of the thus prepared material sheet by means of dull rolls described later, which were incorporated in the temper rolling mill, thereby manufacturing each of the Fe-Ni alloy sheets Nos. 11 to 17 for a shadow mask having a thickness of 0.25 mm. More specifically, the alloy sheets Nos. 11 to 15 were manufactured from the hot-rolled coil for the alloy As is clear from Table 4, the alloy sheets Nos. 11 and 17, have a silicon content, a silicon segregation rate, a center-line mean roughness (Ra), a skewness (Rsk) and a value of "(Ra)+½(Rsk)−0.5", all within the scope of the present invention. In addition, the alloy sheet No. 11 has a sulfur content of 0.0005 wt. % and the alloy sheet No. 17 has a sulfur content of 0.0006 wt. %. These alloy sheets Nos. 11 and 17 are therefore excellent in etching pierceability, with no occurrence of sticking of the flat masks even at a high annealing temperature of 950° C.

The alloy sheet No. 16 has in contrast a silicon content, a silicon segregation rate and a surface roughness, all within the scope of the present invention, but has a sulfur content of 0.0025 wt. % larger than in the alloy sheets Nos. 11 and 17. The alloy sheet No. 16 is therefore excellent in etching pierceability with however the occurrence of sticking of the flat mask on part of the surface thereof at an annealing temperature of 950° C.

This suggests that, even when the silicon content, the silicon segregation rate and the surface roughness are within the scope of the present invention, if a high annealing temperature of the flat masks is maintained, sticking of the flat masks can be prevented by reducing the sulfur content.

The alloy sheet No. 15, in which values of the center-line mean roughness (Ra) and the skewness (Rsk) in two directions are large outside the scope of the present invention but all the other parameters are within the scope of the present invention, is excellent in sticking pierceability, and shows no occurrence of sticking of the flat masks during annealing thereof.

The alloy sheet No. 14, in contrast, annealed at a temperature of 950° C. which was higher than in the alloy sheet No. 15, in which values of the center-line mean roughness (Ra) and the skewness (Rsk) in two directions are large outside the scope of the present invention, is excellent in etching pierceability, but suffers from sticking of the flat mask over the entire surface thereof.

The alloy sheet No. 12, in which values of the center-line mean roughness (Ra) in two directions are large outside the scope of the present invention but all the other parameters are within the scope of the present invention, while being excellent in etching pierceability, shows sticking of the flat mask on part of the surface thereof because of the high annealing temperature of 950° C.

The alloy sheet No. 13, in which values of the center-line mean roughness (Ra) in two directions are large outside the scope of the present invention but all the other parameters are within the scope of the present invention, while being excellent in etching pierceability, shows sticking of the flat mask on part of the surface thereof, as in the alloy sheet No. 12, because of the high annealing temperature of 950° C.

Unlike these alloy sheets Nos. 12, 13 and 14, the above-mentioned alloy sheet Nos. 11 and 17, in which all the parameters are within the scope of the present invention, suffer from no sticking of the flat masks even at a high annealing temperature of 950° C.

These observations reveal that it is necessary to limit values of the center-line mean roughness (Ra) and the skewness (Rsk) in two directions within the scope of the present invention if a high annealing temperature is to be maintained.

EXAMPLE 3

A material sheet for the Fe-Ni alloy sheet for a shadow mask was prepared by repeating a cycle comprising a cold rolling and an annealing in the same manner as in Example 1 with the use of the respective hot-rolled coil from which the alloy sheets Nos. 1, 2 and 7 to 10 were prepared in Example 1. Then upon the final temper rolling, a surface roughness as shown in Table 5 was imparted to the both surfaces of the thus prepared material sheet by means of dull rolls described later, which were incorporated in the temper rolling mill, thereby manufacturing each of the Fe-Ni alloy sheets Nos. 18 to 30 for a shadow mask having a thickness of 0.25 mm. More specifically, the alloy sheets Nos. 18 and 20 to 26 were manufactured from the hot-rolled coil for the alloy sheet No. 1; the alloy sheet No. 19 was manufactured from the hot-rolled coil for the alloy sheet No. 2; the alloy sheet No. 27 was manufactured from the hot-rolled coil for the alloy sheet No. 7; the alloy sheet No. 28 was manufactured from the hot-rolled coil for the alloy sheet No. 8; the alloy sheet No. 29 was manufactured from the hot-rolled coil for the alloy sheet No. 9; and the alloy sheet No. 30 was manufactured from the hot-rolled coil for the alloy sheet No. 10.

The dull rolls had a surface roughness varying with each of the above-mentioned alloy sheets, and were manufactured in the same manner as in Example 1, with a center-line mean roughness (Ra) within a range of from 0.30 to 0.90 μm, a skewness (Rsk) within a range of from −0.2 to −1.3, and an average peak interval (Sm) within a range of from 30 to 210 μm.

The silicon segregation rate of each of the thus manufactured alloy sheets Nos. 18 to 30 was investigated in the same manner as in Example 1. Then, a flat mask was manufactured by forming holes on each of the alloy sheets Nos. 18 to 30 through the etching-piercing to investigate etching pierceability in the same manner as in Example 1, and the surfaces of the holes formed by the etching-piercing were observed by means of a scanning type electron microscope to investigate the presence of pits on the hole surfaces. Then, 30 flat masks were filed up and annealed at a temperature of 900° C. to investigate the occurrence of sticking of the flat masks.

The results are shown in Table 5.

TABLE 5

| Alloy | Alloy sheet No. | Si segregation rate (%) | Surface roughness Ra (L) (μm) | Ra (C) (μm) | Rsk (L) | Rsk (C) | \|Ra(L) − Ra(C)\| (μm) | \|Rsk(L) − Rsk(C)\| | (Ra) + ⅓ (Rsk) − 0.5 | Sm (L) (μm) | Sm (C) (μm) | \|Sm (L) − Sm (C)\| (μm) | Etching pierce-ability | Sticking during annealing |
|---|---|---|---|---|---|---|---|---|---|---|---|---|---|---|
| A | 18 | 4 | 0.50 | 0.60 | +0.6 | +0.7 | 0.10 | 0.1 | Positive | 105 | 111 | 6 | ○ | ○ |
| | 19 | 16 | 0.60 | 0.70 | +0.8 | +0.9 | 0.10 | 0.1 | Positive | 84 | 80 | 4 | Δ | Δ |
| | 20 | 7 | 0.80 | 0.85 | +0.7 | +0.5 | 0.05 | 0.2 | Positive | 140 | 138 | 2 | X | ○ |
| | 21 | 5 | 0.30 | 0.40 | +0.5 | +0.6 | 0.10 | 0.1 | Negative | 153 | 149 | 4 | ○ | X |
| | 22 | 5 | 0.60 | 0.65 | +0.2 | +0.2 | 0.05 | 0.0 | Positive | 80 | 75 | 5 | ⊙ | X |
| | 23 | 6 | 0.50 | 0.65 | +1.3 | +1.2 | 0.15 | 0.1 | Positive | 130 | 127 | 3 | ○ | Δ |
| | 24 | 4 | 0.50 | 0.55 | +1.0 | +1.1 | 0.05 | 0.1 | Positive | 175 | 170 | 5 | Δ | ○ |
| | 25 | 4 | 0.45 | 0.50 | +1.2 | +1.1 | 0.05 | 0.1 | Positive | 53 | 50 | 3 | ○ | Δ |
| | 26 | 4 | 0.55 | 0.60 | +1.0 | +1.1 | 0.05 | 0.1 | Positive | 110 | 111 | 1 | ⊙ | ○ |
| B | 27 | 7 | 0.60 | 0.60 | +0.9 | +0.8 | 0.00 | 0.1 | Positive | 110 | 110 | 0 | ⊙ | ○ |
| C | 28 | 2 | 0.55 | 0.65 | +0.7 | +0.7 | 0.10 | 0.0 | Positive | 95 | 98 | 3 | ○ | X |
| D | 29 | 9 | 0.50 | 0.65 | +0.5 | +0.6 | 0.15 | 0.1 | Positive | 135 | 140 | 5 | X | ○ |
| E | 30 | 2 | 0.50 | 0.55 | +0.9 | +0.8 | 0.05 | 0.1 | Positive | 113 | 115 | 2 | ⊙ | ○ |

As is clear from Table 5, the alloy sheets Nos. 18, 26, 27 and 30 have a silicon content, a silicon segregation rate, a center-line mean roughness (Ra), a skewness (Rsk), a value of "(Ra)+⅓(Rsk)−0.5" and an average peak interval (Sm), all within the scope of the present invention.

These alloy sheets Nos. 18, 26, 27 and 30 are therefore excellent in etching pierceability, and have no sticking of the flat masks during the annealing thereof. The alloy sheets Nos. 26, 27 and 30, which have the value of |Sm(L)−Sm(C)| within the scope of the present invention are particularly excellent in etching pierceability.

The alloy sheets Nos. 19, 28 and 29, in contrast, have a surface roughness within the scope of the present invention. However, the alloy sheet No. 19 has a large silicon segregation rate outside the scope of the present invention; the alloy sheet No. 28 has a small silicon content outside the scope of the present invention; and the alloy sheet No. 29 has a large the silicon content outside the scope of the present invention.

The alloy sheet No. 19 is therefore slightly poor in etching pierceability with the occurrence of sticking of the flat mask on part of the surface thereof; the alloy sheet No. 28, while being excellent in etching pierceability, suffers from the occurrence of sticking of the flat mask over the entire surface thereof during the annealing; and the alloy sheet No. 29 has a very poor etching pierceability, with however no occurrence of sticking of the flat mask.

The alloy sheets Nos. 20 to 23 have a silicon content and a silicon segregation rate within the scope of the present invention. However, the alloy sheet No. 20 has a large center-line mean roughness (Ra) outside the scope of the present invention; the alloy sheet No. 21 has a negative value of "(Ra)+1/3(Rsk)−0.5" outside the scope of the present invention; the alloy sheet No. 22 has a small skewness (Rsk) outside the scope of the present invention; and the alloy sheet No. 23 has a large skewness (Rsk) outside the scope of the present invention.

Therefore, the alloy sheet No. 20 suffers from no sticking of the flat mask but is very poor in etching pierceability; the alloy sheet No. 21, while being excellent in etching pierceability, suffers from the occurrence of sticking of the flat mask over the entire surface thereof during the annealing; the alloy sheet No. 22, while being particularly excellent in etching pierceability, shows sticking of the flat mask over the entire surface thereof during the annealing; and the alloy sheet No. 23, while being excellent in etching pierceability, shows sticking of the flat mask on part of the surface thereof during the annealing.

The alloy sheets Nos. 24 and 25, have values of the silicon content, the silicon segregation rate, the center-line mean roughness (Ra), the skewness (Rsk) and "(Ra)+1/3(Rsk)−0.5", all within the scope of the present invention. However, the alloy sheet No. 24 has a large average peak interval (Sm) outside the scope of the present invention; and the alloy sheet No. 25 has a small average peak interval outside the scope of the present invention.

The alloy sheet No. 24 has, therefore, while showing no sticking of the flat mask during the annealing thereof, a slightly low etching pierceability; and the alloy sheet No. 25, while being excellent in etching pierceability, suffers from sticking of the flat mask on part of the surface thereof during the annealing.

These observations reveal that, in order to obtain an Fe-Ni alloy sheet for a shadow mask, which is particularly excellent in etching pierceability and free from sticking of the flat masks during the annealing thereof, it is necessary, in addition to limiting the silicon content and the silicon segregation rate within the scope of the present invention, to limit values of the center-line mean roughness (Ra), the skewness (Rsk) and the average peak interval (Sm) within the scope of the present invention.

In particular, by limiting the value of the average peak interval (Sm) within the scope of the present invention, a particularly excellent etching pierceability is available.

EXAMPLE 4

A material sheet for the Fe-Ni alloy sheet for a shadow mask was prepared by repeating a cycle comprising a cold rolling and an annealing in the same manner as in Example 1 with the use of the respective hot-rolled coil from which the alloy sheets Nos. 1, 7 and 10 were prepared in Example 1. Then, upon the final temper rolling, a surface roughness as shown in Table 6 was imparted to the both surfaces of the thus prepared material sheet by means of dull rolls described later, which were incorporated into the temper rolling mill, thereby manufacturing each of the Fe-Ni alloy sheets Nos. 31 to 37 having a thickness of 0.25 mm. More specifically, the alloy sheets Nos. 31 to 35 were manufactured from the hot-rolled coil for the alloy sheet No. 1; the alloy sheet No. 36 was manufactured from the hot-rolled coil for the alloy sheet No. 7; and the alloy sheet No. 37 was manufactured from the hot-rolled coil for the alloy sheet No. 10.

The dull rolls had a surface roughness varying with each of the above-mentioned alloy sheets, and were manufactured in the same manner as in Example 1, with a center-line 5 mean roughness (Ra) within a range of from 0.45 to 0.70 μm, a skewness (Rsk) within a range of from −0.4 to −1.2, and an average peak interval (Sm) within a range of from 40 to 200 μm.

Investigation of the silicon segregation rate for each of the alloy sheets Nos. 31 to 37, which was carried out in the same manner as in Example 1, revealed that the silicon segregation rate was within a range of from 4 to 7% in all cases. Then, a flat mask was manufactured by forming holes on each of the alloy sheets Nos. 31 to 37 through the etching-piercing to investigate etching pierceability in the same manner as in Example 1. In addition, 50 flat masks were piled up and annealed at the temperature shown in Table 6 to investigate the occurrence of sticking of the flat masks during the annealing thereof.

The rolling condition of the ingot and the slab and other conditions were the same as in Example 1.

These results are shown in Table 6.

TABLE 6

| Alloy | Alloy sheet No. | Si segregation rate (%) | Surface roughness Ra (L) (μm) | Ra (C) (μm) | Rsk (L) | Rsk (C) | \|Ra(L) − Ra(C)\| (μm) | \|Rsk(L) − Rsk(C)\| | (Ra) + 1/3 (Rsk) − 0.5 | Sm (L) (μm) | Sm (C) (μm) | \|Sm (L) − Sm (C)\| (μm) | Etching pierceability | Sticking during annealing | Annealing temperature (°C.) |
|---|---|---|---|---|---|---|---|---|---|---|---|---|---|---|---|
| A | 31 | 4 | 0.55 | 0.60 | +1.0 | +1.1 | 0.05 | 0.1 | Positive | 110 | 111 | 1 | ◎ | ○ | 950 |
| | 32 | 6 | 0.50 | 0.70 | +0.5 | +0.6 | 0.20 | 0.1 | Positive | 85 | 90 | 5 | ◎ | Δ | 950 |
| | 33 | 7 | 0.55 | 0.65 | +0.5 | +0.8 | 0.10 | 0.3 | Positive | 130 | 134 | 4 | ◎ | Δ | 950 |
| | 34 | 7 | 0.45 | 0.65 | +0.4 | +0.7 | 0.20 | 0.3 | Positive | 145 | 149 | 4 | ◎ | X | 950 |
| | 35 | 7 | 0.45 | 0.65 | +0.4 | +0.7 | 0.20 | 0.3 | Positive | 145 | 149 | 4 | ◎ | ○ | 850 |
| B | 36 | 4 | 0.60 | 0.60 | +0.9 | +0.8 | 0.00 | 0.1 | Positive | 121 | 124 | 3 | ◎ | Δ | 950 |
| E | 37 | 2 | 0.50 | 0.55 | +0.9 | +1.0 | 0.05 | 0.1 | Positive | 110 | 113 | 3 | ◎ | ○ | 950 |

As is clear from Table 6, the alloy sheets Nos. 31 and 37, have a silicon content, a silicon segregation rate, a center-line mean roughness (Ra), a skewness (Rsk), a value of "(Ra)+$\frac{1}{3}$(Rsk)−0.5" and an average peak interval (Sm), all within the scope of the present invention. In addition, the alloy sheet No. 31 has a sulfur content of 0.0005 wt. % and the alloy sheet No. 37 has a sulfur content of 0.0006 wt. %. These alloy sheets Nos. 31 and 37 are therefore very excellent in etching pierceability, with no occurrence of sticking of the flat masks even at an annealing temperature of 950° C.

The alloy sheet No. 36 has in contrast a silicon content, a silicon segregation rate and the above-mentioned values of surface roughness all within the scope of the present invention, but has a sulfur content of 0.0025 wt. %, which is higher than those in the alloy sheets Nos. 31 and 37. The alloy sheet No. 36 is therefore very excellent in etching pierceability but suffers from the occurrence of sticking of the flat mask on part of the surface thereof at an annealing temperature of 950° C.

This suggests that, even when the silicon content, the silicon segregation rate and the surface roughness are all within the scope of the present invention, sticking of the flat masks can be prevented by reducing the sulfur content if a high annealing temperature of the flat masks is to be maintained.

The alloy sheet No. 35, in which values of the center-line mean roughness (Ra) and the skewness (Rsk) in two directions are large outside the scope of the present invention but the other parameters are within the scope of the present invention, is particularly excellent in etching pierceability and shows no occurrence of sticking of the flat masks at an annealing temperature of 850° C.

The alloy sheet No. 34, in contrast, in which values of the center-line mean roughness (Ra) and the skewness (Rsk) in two directions are large outside the scope of the present invention similarly to the alloy sheet No. 35, while being very excellent in etching pierceability, shows the occurrence of sticking of the flat mask over the entire surface thereof at an annealing temperature of 950° C.

The alloy sheet No. 32, in which values of the center-line mean roughness (Ra) in two directions are large outside the scope of the present invention but the other parameters are within the scope of the present invention, while being particularly excellent in etching pierceability, shows the occurrence of sticking of the flat mask on part of the surface thereof because of the high annealing temperature of 950° C.

The alloy sheet No. 33, in which values of the skewness (Rsk) in two directions are large outside the scope of the present invention but the other parameters are within the scope of the present invention, while being particularly excellent in etching pierceability, shows the occurrence of sticking of the flat mask on part of the surface thereof because of the high annealing temperature of 950° C.

Unlike the alloy sheets Nos. 32, 33 and 34, the above-mentioned alloy sheets Nos. 31 and 37, in which all the parameters are within the scope of the present invention, suffers from no sticking of the flat masks even at a high annealing temperature of 950° C.

These observations reveal that it is necessary to limit the values of the center-line mean roughness (Ra) and the skewness (Rsk) in two directions within the scope of the present invention if a high annealing temperature is to be maintained.

EXAMPLE 5

A material sheet for the Fe-Ni alloy sheet for a shadow mask was prepared by repeating a cycle comprising a cold rolling and an annealing in the same manner as in Example 1 with the use of the respective hot-rolled coil from which the alloy sheets Nos. 1, 2, 8 and 9 were prepared in Example 1. Then, upon the final temper rolling, a surface roughness shown in Table 7 was imparted to the both surfaces of the thus prepared material sheet by means of dull rolls described later, which were incorporated into the temper rolling mill, thereby manufacturing each of the Fe-Ni alloy sheets Nos. 38 to 43 having a thickness of 0.25 mm. More specifically, the alloy sheets Nos. 38 to 40 were manufactured from the hot-rolled coil for the alloy sheet No. 1; the alloy sheet No. 41 was manufactured from the hot-rolled coil for the alloy sheet No. 2; the alloy sheet No. 42 was manufactured from the hot-rolled coil for the alloy sheet No. 8; and the alloy sheet No. 43 was manufactured from the hot-rolled coil for the alloy sheet No. 9.

The dull rolls had a surface roughness varying with each of the above-mentioned alloy sheets, and were manufactured in the same manner as in Example 1, with a center-line mean roughness (Ra) within a range of from 0.45 to 0.70 μm, a skewness (Rsk) within a range of from −0.4 to −0.9, and an average peak interval (Sm) within a range of from 40 to 200 μm.

Investigation of the silicon segregation rate for each of the alloy sheets Nos. 38 to 43 was carried out in the same manner as in Example 1. Then, a flat mask was manufactured by forming holes on each of the alloy sheets Nos. 38 to 43 through the etching-piercing to investigate etching pierceability in the same manner as in Example 1. In addition, the flat masks were annealed in accordance with the number of piled up flat masks and the temperature shown in Table 7 to investigate the occurrence of sticking of the flat masks during the annealing thereof.

The rolling condition of the ingot and the slab and other conditions were the same as in Example 1.

These results are shown in Table 7.

TABLE 7

| Alloy | Alloy sheet No. | Si segregation rate (%) | Surface roughness: Ra (L) (μm) | Ra (C) (μm) | Rsk (L) | Rsk (C) | \|Ra (L) − Ra(C)\| (μm) | \|Rsk (L) − Rsk (C)\| | (Ra) + $\frac{1}{3}$ (Rsk) − 0.5 | Sm (L) (μm) | Sm (C) (μm) | \|Sm (L) − Sm (C)\| (μm) | Etching pierceability | Sticking during annealing | Annealing temperature (°C.) | Number of piled up flat masks |
|---|---|---|---|---|---|---|---|---|---|---|---|---|---|---|---|---|
| A | 38 | 4 | 0.40 | 0.40 | +0.2 | +0.3 | 0.00 | 0.1 | Negative | 65 | 63 | 2 | ○ | ○ | 810 | 30 |
| | 39 | 4 | 0.50 | 0.45 | +0.6 | +0.7 | 0.05 | 0.1 | Positive | 50 | 55 | 5 | ○ | Δ | 870 | 50 |
| | 40 | 5 | 0.50 | 0.50 | +0.7 | +0.7 | 0.00 | 0.0 | Positive | 115 | 112 | 3 | ⊙ | ○ | | |
| | 41 | 16 | 0.50 | 0.45 | +0.1 | +0.2 | 0.05 | 0.0 | Negative | 60 | 64 | 4 | Δ | Δ | 810 | 30 |
| C | 42 | 2 | 0.45 | 0.40 | +0.1 | +0.1 | 0.05 | 0.0 | Negative | 45 | 50 | 5 | ○ | X | | |

TABLE 7-continued

| | | | Surface roughness | | | | | | | | | | | | | | |
|---|---|---|---|---|---|---|---|---|---|---|---|---|---|---|---|---|---|
| Alloy | Alloy sheet No. | Si segregation rate (%) | Ra (L) (μm) | Ra (C) (μm) | Rsk (L) | Rsk (C) | \|Ra (L) − Ra(C)\| (μm) | \|Rsk (L) − Rsk (C)\| | (Ra) + $\frac{1}{3}$ (Rsk) − 0.5 | Sm (L) (μm) | Sm (C) (μm) | \|Sm (L) − Sm (C)\| (μm) | Etching pierceability | Sticking during annealing | Annealing temperature (°C.) | Number of piled up flat masks |
| D | 43 | 9 | 0.35 | 0.35 | +0.3 | +0.2 | 0.00 | 0.1 | Negative | 67 | 65 | 2 | X | ○ | | |

As shown in Table 7, the alloy sheet No. 38 has a silicon content, a silicon segregation rate and a center-line mean roughness (Ra), all within the scope of the present invention. The alloy sheet No. 38 is therefore excellent in etching pierceability and free from the occurrence of sticking of the flat masks at an annealing temperature of 810° C.

In contrast, the alloy sheet No. 41 has a high silicon segregation rate outside the scope of the present invention; the alloy sheet No.42 has a low silicon content outside the scope of the present invention; and the alloy sheet No. 43 has a high silicon content outside the scope of the present invention.

Therefore, the alloy sheet No. 41 is slightly poor in etching pierceability and suffers from the occurrence of sticking of the flat mask on part of the surface thereof during the annealing; the alloy sheet No. 42, while being excellent in etching pierceability, shows the occurrence of sticking of the flat mask over the entire surface thereof during the annealing; and the alloy sheet No. 43, while being free from the occurrence of sticking of the flat masks during the annealing, is low in etching pierceability.

This reveals that, when the annealing temperature is as low as 810° C. which is lower than those in Examples 1 to 4, an Fe-Ni alloy sheet for a shadow mask excellent in etching pierceability and permitting prevention of the occurrence of sticking of the flat masks during the annealing, is available only by limiting at least the silicon content, the silicon segregation rate and the center-line mean roughness (Ra) within the scope of the present invention.

The alloy sheet No. 40, in which the silicon content, the silicon segregation rate, the center-line mean roughness (Ra), the skewness (Rsk), the value of "(Ra)+$\frac{1}{3}$(Rsk)−0.5" and the average peak interval (Sm) are all within the scope of the present invention, is particularly excellent in etching pierceability and free from the occurrence of sticking of the flat masks during the annealing.

In contrast, the alloy sheet No. 39, while having the silicon content, the silicon segregation rate, the center-line mean roughness (Ra), the skewness (Rsk) and the value of "(Ra)+$\frac{1}{3}$(Rsk)−0.5" all within the scope of the present invention, has a low average peak interval (Sm) outside the scope of the present invention. Therefore, the alloy sheet No. 39, while being excellent in etching pierceability, shows the occurrence of sticking of the flat mask on part the surface thereof during the annealing.

This suggests that limiting the value of the average peak interval (Sm) within the scope of the present invention, is important for obtaining an Fe-Ni alloy sheet for a shadow mask, which is excellent in etching pierceability and permits prevention of the occurrence of sticking of the flat masks during the annealing.

According to the present invention, as described above in detail, it is possible to obtain an Fe-Ni alloy sheet for a shadow mask, which is excellent in etching pierceability and permits prevention of the occurrence of sticking of the flat masks during the annealing, by limiting the silicon content, the silicon segregation rate and the surface roughness within appropriate ranges, thus providing industrially useful effects.

What is claimed is:

1. A method for manufacturing an Fe-Ni alloy sheet for a shadow mask, said Fe-Ni alloy sheet consisting essentially of:

nickel: from 34 to 38 wt. %,
silicon: from 0.01 to 0.15 wt. %,
manganese: from 0.01 to 1.00 wt. %, and
the balance being iron and incidental impurities;
the surface portion of said alloy sheet having a silicon (Si) segregation rate, as expressed by the following formula, of up to 10%:

$$\left|\left(\begin{array}{c}\text{Si concentration in}\\ \text{segregation region}\end{array}\right) - \left(\begin{array}{c}\text{average Si}\\ \text{concentration}\end{array}\right)\Big/\left(\begin{array}{c}\text{Average Si}\\ \text{concentration}\end{array}\right)\right| \times 100,$$

the method comprising heating an alloy ingot or a continuously cast alloy slab to soak the alloy ingot or cast alloy slab, carrying out a primary slabbing-rolling at a sectional reduction rate of from 20 to 60%, heating the thus primary slabbed-rolled slab to soak the slab, carrying out a secondary slabbing-rolling at a sectional reduction rate of from 30 to 50% and slowly cooling the thus secondary slabbed-rolled slab to attain said silicon segregation rate and finally rolling both surfaces of said alloy sheet by means of a pair of dull rolls so as to impart a center-line mean roughness (Ra), which satisfies the following formula:

$$0.3\ \mu m \leq Ra \leq 0.7\ \mu m.$$

2. A method for manufacturing an Fe-Ni alloy sheet for a shadow mask, said Fe-Ni alloy sheet consisting essentially of:

nickel: from 34 to 38 wt. %,
silicon: from 0.01 to 0.15 wt. %,
manganese: from 0.01 to 1.00 wt. %, and
the balance being iron and incidental impurities;
the surface portion of said alloy sheet having a silicon (Si) segregation rate, as expressed by the following formula, of up to 10%:

$$\left|\left(\begin{array}{c}\text{Si concentration in}\\ \text{segregation region}\end{array}\right) - \left(\begin{array}{c}\text{average Si}\\ \text{concentration}\end{array}\right)\Big/\right.$$

-continued $$\left(\begin{array}{c}\text{Average Si}\\ \text{concentration}\end{array}\right)\Bigg| \times 100,$$

the method comprising heating an alloy ingot or a continuously cast alloy slab to soak the alloy ingot or cast alloy slab, carrying out a primary slabbing-rolling at a sectional reduction rate of from 20 to 60%, heating the thus primary slabbed-rolled slab to soak the slab, carrying out a secondary slabbing-rolling at a sectional reduction rate of from 30 to 50% and slowly cooling the thus secondary slabbed-rolled slab to attain said silicon segregation rate and finally rolling both surfaces of said alloy sheet by means of a pair of dull rolls so as to impart a center-line mean roughness (Ra), and a skewness (Rsk), which is a deviation index in the height direction of the roughness curve, which satisfy the following formulae:

$$0.3\ \mu m \leqq Ra \leqq 0.7\ \mu m,$$

$$0.3 \leqq Rsk \leqq 1.0, \text{ and}$$

$$Ra \leqq -\tfrac{1}{3}Rsk + 0.5.$$

3. The method as claimed in claim 2, wherein:

said center-line mean roughness (Ra) and said skewness (Rsk) of said Fe-Ni alloy sheet in two directions further satisfy the following formulae:

$$|Ra(L) - Ra(C)| \leqq 0.1\ \mu m, \text{ and}$$

$$|Rsk(L) - Rsk(C)| \leqq 0.2,$$

where,

Ra(L): center-line mean roughness of said alloy sheet in the rolling direction,

Ra(C): center-line mean roughness of said alloy sheet in the crosswise direction to the rolling direction, Rsk(L): skewness of said alloy sheet in the rolling direction, and Rsk(C): skewness of said alloy sheet in the crosswise direction to the rolling direction.

4. A method for manufacturing an Fe-Ni alloy sheet for a shadow mask, said Fe-Ni alloy sheet consisting essentially of:

nickel: from 34 to 38 wt. %, silicon: from 0.01 to 0.15 wt. %, manganese: from 0.01 to 1.00 wt. %, and the balance being iron and incidental impurities;

the surface portion of said alloy sheet having a silicon (Si) segregation rate, as expressed by the following formula, of up to 10%:

$$\left|\left(\begin{array}{c}\text{Si concentration in}\\ \text{segregation region}\end{array}\right) - \left(\begin{array}{c}\text{average Si}\\ \text{concentration}\end{array}\right)\right/ \left(\begin{array}{c}\text{Average Si}\\ \text{concentration}\end{array}\right)\Bigg| \times 100,$$

the method comprising heating an alloy ingot or a continuously cast alloy slab to soak the alloy ingot or cast alloy slab, carrying out a primary slabbing-rolling at a sectional reduction rate of from 20 to 60%, heating the thus primary slabbed-rolled slab to soak the slab, carrying out a secondary slabbing-rolling at a sectional reduction rate of from 30 to 50% and slowly cooling the thus secondary slabbed-rolled slab to attain said silicon segregation rate and finally rolling both surfaces of said alloy sheet by means of a pair of dull rolls so as to impart a center-line mean roughness (Ra), a skewness (Rsk), which is a deviation index in the height direction of the roughness curve, and an average peak interval (Sm) of the sectional curve, which satisfy the following formulae:

$$0.3\ \mu m \leqq Ra \leqq 0.7\ \mu m,$$

$$0.3 \leqq Rsk \leqq 1.2,$$

$$Ra \geqq -\tfrac{1}{3}Rsk + 0.5, \text{ and}$$

$$70\ \mu m \leqq Sm \leqq 160\ \mu m.$$

5. The method as claimed in claim 4, wherein:

said center-line mean roughness (Ra), said skewness (Rsk) and said average peak interval (Sm) of said Fe-Ni alloy sheet in two directions further satisfy the following formulae:

$$|Ra(L) - Ra(C)| \leqq 0.1\ \mu m,$$

$$|Rsk(L) - Rsk(C)| \leqq 0.2, \text{ and}$$

$$|Sm(L) - Sm(C)| \leqq 5.0\ \mu m,$$

where,

Ra(L): center-line mean roughness of said alloy sheet in the rolling direction,

Ra(C): center-line mean roughness of said alloy sheet in the crosswise direction to the rolling direction, Rsk(L): skewness of said alloy sheet in the rolling direction, Rsk(C): skewness of said alloy sheet in the crosswise direction to the rolling direction, Sm(L): average peak interval of said alloy sheet in the rolling direction, and Sm(C): average peak interval of said alloy sheet in the crosswise direction to the rolling direction.

6. The method as claimed in any one of claims 1 to 5, wherein:

said final rolling is a cold rolling.

7. The method as claimed in any one of claims 1 to 5, wherein:

said final rolling is a temper rolling.

8. The method as claimed in claim 1 wherein the heating of the alloy slab ingot or the continuous cast alloy slab and the heating of the primary slabbed-rolled slab are carried out at a temperature of 1200° C. for 20 hours; and the final rolling is carried out at a rolling speed of 100 m/minute, a tension of the alloy sheet of 20 $kg/mm^2$ on the downstream side in the rolling direction of the dull rolls, a tension of the alloy sheet of 15 $kg/mm^2$ on the upstream side in the rolling direction of the dull rolls and a reduction force per unit sheet width of 0.20 tons/mm.

9. The method as claimed in claim 2, wherein the heating of the alloy slab ingot or the continuous cast alloy slab and the heating of the primary slabbed-rolled slab are carried out at a temperature of 1200° C. for 20 hours; and the final rolling is carried out at a rolling speed of 100 m/minute, a tension of the alloy sheet of 20 $kg/mm^2$ on the downstream side in the rolling direction of the dull rolls, a tension of the alloy sheet of 15 $kg/mm^2$ on the upstream side in the rolling direction of the dull rolls and a reduction force per unit sheet width of 0.20 tons/mm.

10. The method as claimed in claim 4, wherein the heating of the alloy slab ingot or the continuous cast alloy slab and the heating of the primary slabbed-rolled slab are carried out at a temperature of 1200° C. for 20 hours; and the final rolling is carried out at a rolling speed of 100 m/minute, a tension of the alloy sheet of 20 $kg/mm^2$ on the downstream side in the rolling direction of the dull rolls, a tension of the alloy sheet of 15 $kg/mm^2$ on the upstream side in the rolling direction of the dull rolls and a reduction force per unit sheet width of 0.20 tons/mm.

* * * * *